US009965217B2

(12) United States Patent
Gordon et al.

(10) Patent No.: US 9,965,217 B2
(45) Date of Patent: May 8, 2018

(54) MANAGING DATA IN A STORAGE SYSTEM

(71) Applicant: KAMINARIO TECHNOLOGIES LTD., Yokne'am ILIT (IL)

(72) Inventors: Eyal Gordon, Haifa (IL); Benny Koren, Zikhron Ya'aqov (IL); Yedidia Atzmony, Omer (IL); Doron Tal, Haifa (IL); Shachar Fienblit, Ein Ayala (IL); Ilan Steinberg, Haifa (IL)

(73) Assignee: Kaminario Technologies Ltd., Yokne'am ILIT (IL)

( * ) Notice: Subject to any disclaimer, the term of this patent is extended or adjusted under 35 U.S.C. 154(b) by 0 days. days.

(21) Appl. No.: 15/415,274

(22) Filed: Jan. 25, 2017

(65) Prior Publication Data

US 2017/0131913 A1 May 11, 2017

Related U.S. Application Data

(63) Continuation of application No. 13/898,044, filed on May 20, 2013.

(51) Int. Cl.
G06F 3/06 (2006.01)

(52) U.S. Cl.
CPC .............. *G06F 3/065* (2013.01); *G06F 3/067* (2013.01); *G06F 3/0619* (2013.01)

(58) Field of Classification Search
CPC ......... G06F 3/0619; G06F 3/065; G06F 3/067
See application file for complete search history.

(56) References Cited

U.S. PATENT DOCUMENTS

| 6,738,790 | B1 | 5/2004 | Klein et al. |
| 6,895,415 | B1* | 5/2005 | Rezaul Islam ........ G06F 3/0611 |
| 9,268,652 | B1 | 2/2016 | Salyers et al. |
| 2006/0184587 | A1 | 8/2006 | Federwisch |
| 2007/0067583 | A1 | 3/2007 | Zohar et al. |
| 2008/0005196 | A1 | 1/2008 | Beck |
| 2008/0091894 | A1 | 4/2008 | Retnamma et al. |
| 2011/0167221 | A1* | 7/2011 | Pangal ................ G06F 11/1453 711/117 |
| 2012/0166389 | A1 | 6/2012 | Shiozawa |

* cited by examiner

*Primary Examiner* — Aracelis Ruiz
(74) *Attorney, Agent, or Firm* — Wiggin and Dana LLP; Gregory S. Rosenblatt; Jonathan D. Hall

(57) ABSTRACT

According to an aspect of the presently disclosed subject matter, there is provided a system for managing data in a storage system, the system including a storage layer which provides storage resource, and a snapshot layer that includes: a volume-version data structure, a chunk-version data structure and a IO handler.

30 Claims, 9 Drawing Sheets

MANAGING DATA IN A STORAGE SYSTEM

CROSS REFERENCE TO RELATED APPLICATION

This application is a continuation of U.S. patent application Ser. No. 13/898,044, titled "Managing data in a Storage System" and filed May 20, 2013. The contents of U.S. Ser. No. 13/898,044 are hereby incorporated by reference herein in their entirety.

FIELD OF THE INVENTION

The present invention is in the field of storage systems and relates to managing data in a storage system that implements snapshots.

SUMMARY

Many of the functional components of the presently disclosed subject matter can be implemented in various forms, for example, as hardware circuits comprising custom VLSI circuits or gate arrays, or the like, as programmable hardware devices such as FPGAs or the like, or as a software program code stored on an intangible computer readable medium and executable by various processors, and any combination thereof. A specific component of the presently disclosed subject matter can be formed by one particular segment of software code, or by a plurality of segments, which can be joined together and collectively act or behave according to the presently disclosed limitations attributed to the respective component. For example, the component can be distributed over several code segments such as objects, procedures, and functions, and can originate from several programs or program files which operate in conjunction to provide the presently disclosed component.

In a similar manner, a presently disclosed component(s) can be embodied in operational data or operational data can be used by a presently disclosed component(s). By way of example, such operational data can be stored on tangible computer readable medium. The operational data can be a single data set, or it can be an aggregation of data stored at different locations, on different network nodes or on different storage devices.

According to an aspect of the presently disclosed subject matter, there is provided a method of managing data in a storage system. According to examples of the presently disclosed subject matter, the method of managing data in a storage system can include: maintaining a volume-version data structure including LU volume entries for a LU volume and for snapshot volumes associated with the LU volume, wherein for each volume a respective volume ID is kept, and for each snapshot a timestamp for the snapshot operation and an indication of a connection between a respective target volume and a source volume are kept; maintaining a chunk-version data structure that is uniquely associated with a volume ID and a logical chunk address combination; including in the chunk-version data structure one or more chunk-version data elements, each chunk version data element including a timestamp at a corresponding write to the respective logical chunk address in the respective volume and a pointer to storage resources associated with the chunk-version data element.

According to an aspect of the presently disclosed subject matter, there is provided a storage system. According to examples of the presently disclosed subject matter, the storage layer can include a storage layer which provides storage resource, and a snapshot layer that includes: a volume-version data structure, a chunk-version data structure and a IO handler. The volume-version data structure can include LU volume entries for an LU volume and for snapshot volumes associated with the LU volume, wherein for each volume a respective volume ID can be kept, and for each snapshot a timestamp for the snapshot operation and an indication of a connection between a respective target volume and a source volume can be kept. The chunk-version data structure can be uniquely associated with a volume ID and a logical chunk address combination. The IO handler can be configured to include in the chunk-version data structure one or more chunk-version data elements, each chunk version data element including a timestamp at a corresponding write to the respective logical chunk address in the respective volume and a pointer to storage resources associated with the chunk-version data element.

According to yet another aspect of the presently disclosed subject matter, there is provided a program storage device readable by machine, tangibly embodying a program of instructions executable by the machine to perform a method of managing data in a storage system. According to examples of the presently disclosed subject matter, the program of instructions executable by the machine can include instructions: for maintaining a volume-version data structure including LU volume entries for an LU volume and for snapshot volumes associated with the LU volume, wherein for each volume a respective volume ID is kept, and for each snapshot a timestamp for the snapshot operation and an indication of a connection between a respective target volume and a source volume are kept; for maintaining a chunk-version data structure that is uniquely associated with a volume ID and a logical chunk address combination; and for including in the chunk-version data structure one or more chunk-version data elements, each chunk version data element including a timestamp at a corresponding write to the respective logical chunk address in the respective volume and a pointer to storage resources associated with the chunk-version data element.

According to an aspect of the presently disclosed subject matter, there is provided a computer program product comprising a computer useable medium having computer readable program code embodied therein for managing data in a storage system. According to examples of the presently disclosed subject matter, the computer program product can include: computer readable program code for causing the computer to maintain a volume-version data structure including LU volume entries for an LU volume and for snapshot volumes associated with the LU volume, wherein for each volume a respective volume ID is kept, and for each snapshot a timestamp for the snapshot operation and an indication of a connection between a respective target volume and a source volume are kept; computer readable program code for causing the computer to maintain a chunk-version data structure that is uniquely associated with a volume ID and a logical chunk address combination; and computer readable program code for causing the computer to include in the chunk-version data structure one or more chunk-version data elements, each chunk version data element including a timestamp at a corresponding write to the respective logical chunk address in the respective volume and a pointer to storage resources associated with the chunk-version data element.

According to still a further aspect of the presently disclosed subject matter, there is provided a method of handling writes in a storage system. According to examples of the presently disclosed subject matter, the method of handling writes in a storage system can include in response to receiving a write command determining with which snapshot layer chunk the write command is associated, and whether there is an existing chunk version data structure which is associated with the snapshot layer chunk with which the write command is associated; in case the write command is associated with an existing chunk-version data structure, reading a timestamp from a last chunk-version data element in the existing chunk-version data structure, and if there is a snapshot operation whose source is a volume referenced in the write command and this snapshot operation is associated with a timestamp that is later than a timestamp of the last chunk-version data element, maintaining the last chunk-version data element and adding to the existing chunk-version data structure a new chunk version data element for the write command.

According to another aspect of the presently disclosed subject matter, there is provided a storage system. According to examples of the presently disclosed subject matter, the storage layer can include a storage layer which provides storage resource, and a snapshot layer that includes: a volume-version data structure, a chunk-version data structure and a IO handler. The IO handler can be responsive to receiving a write command in the snapshot layer for determining with which snapshot layer chunk the write command is associated, and whether there is an existing chunk version data structure which is associated with the snapshot layer chunk with which the write command is associated. In case the write command is associated with an existing chunk-version data structure, the IO handler can be configured to read a timestamp from a last chunk-version data element in the existing chunk-version data structure. If there is a snapshot operation whose source is a volume referenced in the write command and this snapshot operation is associated with a timestamp that is later than a timestamp of the last chunk-version data element, the IO handler can be configured to maintain the last chunk-version data element and to add to the existing chunk-version data structure a new chunk version data element for the write command.

According to yet another aspect of the presently disclosed subject matter, there is provided a program storage device readable by machine, tangibly embodying a program of instructions executable by the machine to perform a method of handling writes in a storage system. According to examples of the presently disclosed subject matter, the program of instructions executable by the machine can include instructions: for determining, in response to receiving a write command, with which snapshot layer chunk the write command is associated, and whether there is an existing chunk version data structure which is associated with the snapshot layer chunk with which the write command is associated; for reading, in case the write command is associated with an existing chunk-version data structure, a timestamp from a last chunk-version data element in the existing chunk-version data structure, and for maintaining the last chunk-version data element and adding to the existing chunk-version data structure a new chunk version data element for the write command, if there is a snapshot operation whose source is a volume referenced in the write command and this snapshot operation is associated with a timestamp that is later than a timestamp of the last chunk-version data element.

According to an aspect of the presently disclosed subject matter, there is provided a computer program product comprising a computer useable medium having computer readable program code embodied therein for handling writes in a storage system. According to examples of the presently disclosed subject matter, the computer program product can include: computer readable program code that is responsive to receiving a write command in the storage system for causing the computer to determine with which snapshot layer chunk the write command is associated, and to determine whether there is an existing chunk version data structure which is associated with the snapshot layer chunk with which the write command is associated; computer readable program code for causing the computer to determine whether the write command is associated with an existing chunk-version data structure, and in case the write command is associated with an existing chunk-version data structure, the computer readable program code is configured to cause a timestamp from a last chunk-version data element in the existing chunk-version data structure to be read, and if there is a snapshot operation whose source is a volume referenced in the write command and this snapshot operation is associated with a timestamp that is later than a timestamp of the last chunk-version data element, the computer readable program code is configured to cause the last chunk-version data element to maintained and a new chunk version data element for the write command to be added to the existing chunk-version data structure.

According to yet another aspect of the presently disclosed subject matter, there is provided a method of handling reading in a storage system. According to examples of the presently disclosed subject matter, the method of handling reads in a storage system can include: (a) in response to receiving a read command at the storage system determining with which volume and with which snapshot layer chunk the read command is associated, initializing a read pointer with respective volume ID and logical chunk address, and initializing a time-marker according to a timestamp at receipt of the read command; (b) determining whether there is a chunk-version data structure that is associated with a current read pointer; (c1) if the condition in operation (b) is not met, determining whether there is a snapshot operation where the volume that is referenced in the write pointer is a target volume and whether the snapshot operation is associated with a timestamp that is not greater than the current time-marker; and (d1) if the conditions in operation (c) are met updating the read pointer with a volume ID of a source volume of the snapshot operation, updating the time-marker with the timestamp for the snapshot operation—1, and returning to operation (b).

According to another aspect of the presently disclosed subject matter, there is provided a storage system. According to examples of the presently disclosed subject matter, the storage layer can include a storage layer which provides storage resource, and a snapshot layer that includes: a volume-version data structure, a chunk-version data structure and a IO handler. The IO handler can be responsive to receiving a write command for: (a) determining with which volume and with which snapshot layer chunk the read command is associated, initializing a read pointer with respective volume ID and logical chunk address, and initializing a time-marker according to a timestamp of the read command; (b) determining whether there is a chunk-version data structure that is associated with a current read pointer; (c1) if the condition in operation (b) is not met, determining whether there is a snapshot operation where the volume that is referenced in the write pointer is a target volume and whether the snapshot operation is associated with a timestamp that is not greater than the current time-marker; and (d1) if the conditions in operation (c) are met the IO under is configured for: updating the read pointer with a volume ID of a source volume of the snapshot operation, updating the time-marker with the timestamp for the snapshot operation—1, and returning to operation (b).

According to yet another aspect of the presently disclosed subject matter, there is provided a program storage device readable by machine, tangibly embodying a program of instructions executable by the machine to perform a method of handling reads in a storage system. According to examples of the presently disclosed subject matter, the program of instructions executable by the machine can include instructions: for (a) determining, in response to receiving a read command at the storage system, with which volume and with which snapshot layer chunk the read command is associated, initializing a read pointer with respective volume ID and logical chunk address, and initializing a time-marker according to a timestamp of the read command; for (b) determining whether there is a chunk-version data structure that is associated with a current read pointer; for (c1) determining, if the condition in operation (b) is not met, whether there is a snapshot operation where the volume that is referenced in the write pointer is a target volume and whether the snapshot operation is associated with a timestamp that is not greater than the current time-marker; and for (d1) updating, if the conditions in operation (c) are met, the read pointer with a volume ID of a source volume of the snapshot operation, updating the time-marker with the timestamp for the snapshot operation—1, and returning to operation (b).

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
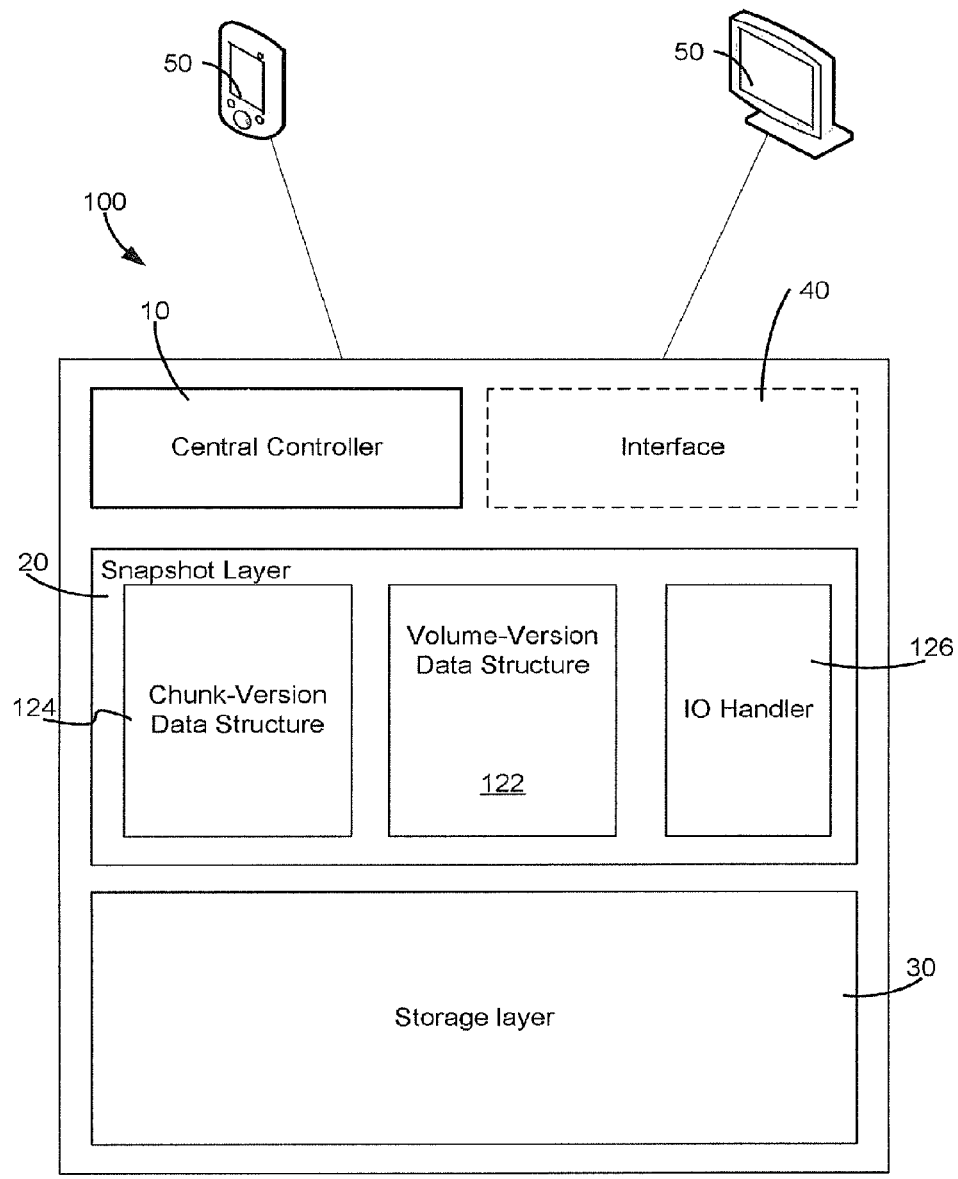
FIG. 1 is a block diagram illustration of a storage system which includes a snapshot layer for supporting and managing snapshot volumes and data versioning, according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without some of these specific details. In other instances, well-known methods, procedures and components have not been described in detail so as not to obscure the presently disclosed subject matter.

Unless specifically stated otherwise, as apparent from the following discussions, it is appreciated that throughout the specification various functional terms refer to the action and/or processes of a computer or computing device, or similar electronic computing device, that manipulate and/or transform data represented as physical, such as electronic, quantities within the computing device's registers and/or memories into other data similarly represented as physical quantities within the computing device's memories, registers or other such tangible information storage, transmission or display devices.

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

As used herein, the terms "example", "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

The operations in accordance with the teachings herein may be performed by a computer specially constructed for the desired purposes or by a general purpose computer specially configured for the desired purpose by a computer program stored in a non-transitory computer readable storage medium.

Embodiments of the presently disclosed subject matter are not described with reference to any particular programming language. It will be appreciated that a variety of programming languages may be used to implement the teachings of the presently disclosed subject matter as described herein.

Unless specifically stated otherwise, as apparent from the following discussions, it is appreciated that throughout the specification discussions utilizing terms such as "processing", "obtaining", "utilizing", "determining", "generating", "setting", "configuring", "selecting", "searching", "receiving", "storing" or the like, include actions and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities/

According to an aspect the presently disclosed subject matter, there is disclosed a method of managing data in a storage system. According to examples of the presently disclosed subject matter, the method can include maintaining a volume-version data structure including LU volume entries for an LU volume and for snapshot volumes associated with the LU volume, wherein for each volume a respective volume ID is kept, and for each snapshot a timestamp for the snapshot operation and an indication of a connection between a respective target volume and a source volume are kept; maintaining a chunk-version data structure that is uniquely associated with a specific snapshot-layer chunk; and including in the chunk-version data structure one or more chunk-version data elements, each chunk version data element including a timestamp at a corresponding write to the respective snapshot layer chunk and a pointer to storage resources associated with the chunk-version data element. It would be appreciated that according to examples of the presently disclosed subject matter, the snapshot operations can be implemented with respect to consistency groups. Each consistency group can include two or more volumes (with zero or more LU volume and zero or more snapshot volumes) and is regarded as a single entity for the purposes of taking snapshots. A snapshot of a consistency group, in effect, produces a snapshot of each volume (LU volume and/or snapshot volume) that is a member of the consistency group. It would be appreciated that a snapshot create command that is directed to a consistency group can be carried out as a plurality of snapshot create commands one with respect to each one of the plurality of (volume) members of the consistency group. It should be noted that throughout the description and in the claims, the term "volume" (including LU volume and snapshot volume) also means a consistency group, and that examples of the presently disclosed subject matter which relate to a volume (including LU volume and snapshot volume) also relate to a consistency group.

According to examples of the presently disclosed subject matter, each snapshot layer chunk is associated with a specific volume ID and logical chunk address combination, and the key of the chunk-version data structure is the volume ID and logical chunk address combination with which the respective snapshot layer chunk is associated.

According to further examples of the presently disclosed subject matter, the storage resources in the chunk-version data element are the storage resources that were allocated for storing the snapshot layer chunk data.

According to an aspect the presently disclosed subject matter, there is disclosed a storage system. According to examples of the presently disclosed subject matter, the storage system according to examples of the presently disclosed subject matter can include a central controller, a snapshot layer and a storage layer. Further by way of example, the snapshot layer can include a volume-version data structure and a chunk-version data structure. The volume-version data structure can include LU volume entries for an LU volume and for snapshot volumes associated with the LU volume. For each volume, the volume-version data structure can hold a respective volume ID, and for each snapshot, the volume-version data structure can hold a timestamp for the snapshot operation and an indication of a connection between a respective target volume and a source volume. The chunk version data structure is uniquely associated with a volume ID and a logical chunk address combination, and hold one or more chunk-version data elements. Each chunk-version data element includes a timestamp at a corresponding write to the respective logical chunk address in the respective volume and a pointer to storage resources associated with the chunk-version data element Throughout the description and the claims, reference is made to the term "logical unit volume" or "LU volume" in abbreviation. The term LU volume (or logical unit volume) is known in the art of digital storage, and the following definition is provided as a non-limiting example only for convenience purposes. Accordingly, the interpretation of the term LU volume in the claims, unless stated otherwise, is not limited to the definitions below and the term LU volume should be given its broadest reasonable interpretation. The term LU volume as used herein relates to a logical unit created by a volume create command or an equivalent command. For example, in the SCSI storage protocol, an LU volume is created by such a volume create command.

Throughout the description and the claims, reference is made to the term "snapshot volume". The term snapshot volume is known in the art of digital storage, and the following definition is provided as a non-limiting example only for convenience purposes. Accordingly, the interpretation of the term snapshot volume in the claims, unless stated otherwise, is not limited to the definitions below and the term snapshot volume should be given its broadest reasonable interpretation. The term snapshot volume as used herein relates to a logical unit created by a snapshot create command or by an equivalent command. For example, in the SCSI storage protocol, a snapshot volume is created by such a snapshot create command. In accordance with examples of the presently disclosed subject matter, in response to receiving a snapshot create command referencing a certain source volume (the source volume can be a LU volume or another snapshot volume) and a target volume, the following set of operations can be implemented: I/Os to the source volume can be suspended; a timestamp or counter can be incremented; data structures which are related to the snapshot operation can be updated; and the lock on the source volume can be released allowing the I/Os to the source volume to resume. It would be appreciated that according to examples of the presently disclosed subject matter, the counter can be (but is not necessarily) a logical counter that is incremented by a whole number for each operation at the volume level (e.g., snapshot create, volume create, volume revert/restore, etc.). The term timestamp relates to a reading from the counter, and represent the state of the counter at a given instant. In this regard, in the case of a logical counter, a timestamp at a certain write command represents the state of the counter following the most recent volume level operation, and at a given counter state several writes can be processed, and each of which would be associated with the same timestamp.

For convenience, in the description of examples of the presently disclosed subject matter, reference is made to a logical counter. However, further examples of the presently disclosed subject matter can be implemented with other types of timestamps or counters including for example a timestamp that is generated using an external clock, and in such an implementation instead of the timestamp increment operation the external clock can be read and the relevant time record. Those versed in the art can readily apply such alternative timestamp implementations to the teachings provided here.

According to examples of the presently disclosed subject matter, a volume that is replicated by a LU revert command or by a LU restore can also be regarded herein as a snapshot volume. Further according to examples of the presently disclosed subject matter, a revert or restore operation as it is referred to herein is an operation in which the data of a certain source volume is copied in a snapshot operation to a target volume that is associated with a certain existing (in the same volume version data structure) volume ID. The handling of a revert or restore operation according to examples of the presently disclosed subject matter, is further described below. For convenience, except where reference is particular made to a revert or restore operation, any reference that is made to a snapshot operation is applicable also to a revert or restore operation, mutatis mutandis.

A snapshot operation involves replicating a certain source volume at a certain point in time to provide a target snapshot volume. Usually when the snapshot volume is initiated, a set of references (pointers) pointing to storage resources from the storage layer that were allocated to the source volume are used, and when new data is written to the target volume new storage resources are allocated and the references are updated to point to the new resources. This type of snapshot implementation is sometimes referred to as "copy on write" or COW in abbreviation. A "split-mirror" snapshot implementation references all the data on a set of mirrored drives. Every time a snapshot is created, the entire volume is copied, not only the new or updated data. Examples of the presently disclosed subject matter are applicant to storage system which implement COW snapshots.

Throughout the description and the claims, reference is made to the term "snapshot layer". The term snapshot layer is known in the art of digital storage, and the following definition is provided as a non-limiting example only for convenience purposes. Accordingly, the interpretation of the term snapshot layer in the claims, unless stated otherwise, is not limited to the definitions below and the term snapshot layer should be given its broadest reasonable interpretation. The term snapshot layer as used herein, relates to a logical layer in a storage system which is used to manage snapshot operations including mapping of different versions of data in the storage system's volumes. The snapshot layer can be capable of managing volume creation, data versioning and resource allocation, including storage resource allocations to snapshot layer chunks and mapping of external addresses to snapshot layer chunks and vice-versa. It would be appreciated that a snapshot layer can be designed to provide high-availability and fault tolerance.

Throughout the description and the claims, reference is made to the term "storage layer". The term storage layer is known in the art of digital storage, and the following definition is provided as a non-limiting example only for convenience purposes. Accordingly, the interpretation of the term storage layer in the claims, unless stated otherwise, is not limited to the definitions below and the term storage layer should be given its broadest reasonable interpretation. The term storage layer as used herein relates to a storage system layer which allocates storage resources, for example, a highly available disk array. The storage layer can be a virtual layer that is implemented over a plurality of units, such as hard drive disks, flash drives etc. The storage layer can provide a single address space for storing the data set of the storage system. From the perspective of the snapshot layer the storage layer provides a set of storage resource addresses, where the data can be written or from which data can be read. The snapshot layer can hold a map or other data structures in which the storage resources addresses allocated by the storage layer for LU volume chunks and for snapshot volume chunks are recorded.

The term "snapshot layer chunk", as used herein relates to the basic allocation unit that is managed by the snapshot layer. For each snapshot layer chunk, a fixed number of consecutive storage layer blocks can be allocated. According to examples of the presently disclosed subject matter, each chunk in the snapshot layer can be associated with a specific logical chunk address, or LCA in abbreviation. Further according to examples of the presently disclosed subject matter, a unique identifier of a snapshot layer chunk can be a combination of an LCA and a volume ID, and for each snapshot layer chunk different storage layer resources can be allocated. For example, <LU1, LCA 1> can denote a first snapshot layer chunk which is separate and distinct from a second snapshot layer chunk <LU2, LCA1>.

Yet further according to examples of the presently disclosed subject matter, a chunk and the respective storage layer resources can be allocated when the storage layer resources are required by the snapshot layer, as will be described below.

The term "logical block address" or LBA in abbreviation as used herein, relates to the basic reference unit which is used by the storage system and external hosts. According to examples of the presently disclosed subject matter, the snapshot layer is configured to translate LBAs in a given volume to a respective LCA in the volume. For example, the LBAs can be numerical and range from 1-n, and the corresponding LCA can be derived by rounding down of the LBA address to the nearest LCA, according to the number of LBAs with which each LCA is associated. In some examples of the presently disclosed subject matter, a partly or an entirely overlapping LBA range (e.g., 1-n) can be used with multiple, different volumes (e.g., all the volumes) in the storage system, and therefore in order to reference a specific logical block or snapshot layer chunk, a reference to the volume with which the logical block or snapshot layer chunk is associated may be required. Accordingly, in some examples of the presently disclosed subject matter, a logical block and a snapshot layer chunk are referenced by a combination of a respective volume ID and LBA or LCA. The combinations <volume ID, LBA> and <volume ID, LCA> are unique within the storage system. It would be appreciated that this sort of addressing scheme can be made compatible with some existing storage protocols, such as SCSI for example.

It should be appreciated that the above addressing scheme is merely one possible implementation of an addressing scheme and is used herein by way of example only, and in further examples of the presently disclosed subject matter, different addressing schemes may be used. For example, in a different addressing scheme, each volume in the storage system can be associated with a different range of LBAs and respective LCAs, and in such a case there is no need to reference the volume ID with the LBAs or LCAs.

The storage layer can also implement different addressing schemes and can manage the storage resources in different ways. For example, the basic storage layer resource can be a "storage layer block" or SRA in abbreviation, and this can be the granularity at which the storage layer operates in terms of locking and metadata (including the maintenance and management of validity indications). In some examples of the presently disclosed subject matter, the storage layer can implement a further management layer over the "SRAs"

and can allocate storage resources to the snapshot layer in "segments" where each segment spans a predefined number of SRAs, typically consecutive SRAs. For the sake of illustration, and by way of example only, the storage system can use the following units: 128 kb snapshot layer chunks, 4 kb storage layer segments, 512 bytes LBAs and 512 bytes SRAs.

As mentioned above, and as will be described in greater detail below, according to examples of the presently disclosed subject matter, the storage system can implement and manage an external addressing scheme (the one that is used between the storage system and external hosts), a snapshot layer addressing scheme and a storage layer addressing scheme, and each of these addressing schemes can have a different granularity. Allocation tables and management modules may be required to allow a seamless operation across the various storage layers and with the external hosts. For convenience, the description initially relates to a storage system in which the snapshot layer addressing scheme and the storage layer addressing scheme have the same granularity. Further examples of the presently disclosed subject matter, some of which are described below, relate to storage systems in which the snapshot layer addressing scheme and the storage layer addressing scheme have a different granularity.

Reference is initially made to FIG. 1 which is a block diagram illustration of a storage system which includes a snapshot layer for supporting and managing snapshot volumes and data versioning, according to examples of the presently disclosed subject matter. According to examples of the presently disclosed subject matter, the storage system 100 can include a central controller 10, a snapshot layer 20 and a storage layer 30. The storage system 100 can also include an interface 40, for interfacing the storage system 100 with hosts 50.

According to examples of the presently disclosed subject matter, the snapshot layer 120 can include a volume-version data structure 122 and chunk-version data structures 124. The volume-version data structure 122 can include volume entries for an LU volume and for snapshot volumes associated with the LU volume.

It would be appreciated that the storage system 100 can allocate a plurality of LU volumes (for example, via a volume create command), and some or all such volumes can be independent logical storage entities. It would be appreciated that some operations in a storage system are exclusively defined with respect to volumes (LU volumes and/or snapshot volumes). For example, volume create, snapshot create and restore create are operations which are defined with respect to volumes. Furthermore, LU volumes can be associated with snapshot volumes, and independent sets of logical volumes can thus be formed. Further by way of example and for illustration purposes, such independent sets of logical volumes can be each associated with a distinct and separate volume-version data structure, which is maintained in the snapshot layer 120. For simplicity, many of the examples disclosed herein relate to one such volume-version data structure 122. However, examples of the presently disclosed subject matter are applicable to, and encompass, a storage system and a snapshot layer which has a plurality of volume-version data structures (for example, two three, . . . , n). It would also be appreciated that the volume-version data can be organized in any other form or structure as will be known to those versed in the art.

For each volume (LU volume or snapshot volume), the volume-version data structure 122 can hold a respective volume ID, and for each snapshot, the volume-version data structure 122 can hold a timestamp for the snapshot operation and an indication of a connection between a respective target volume and a source volume. It would be appreciated that a source volume of a given snapshot operation can be a LU volume or another snapshot volume.

Figure 2:
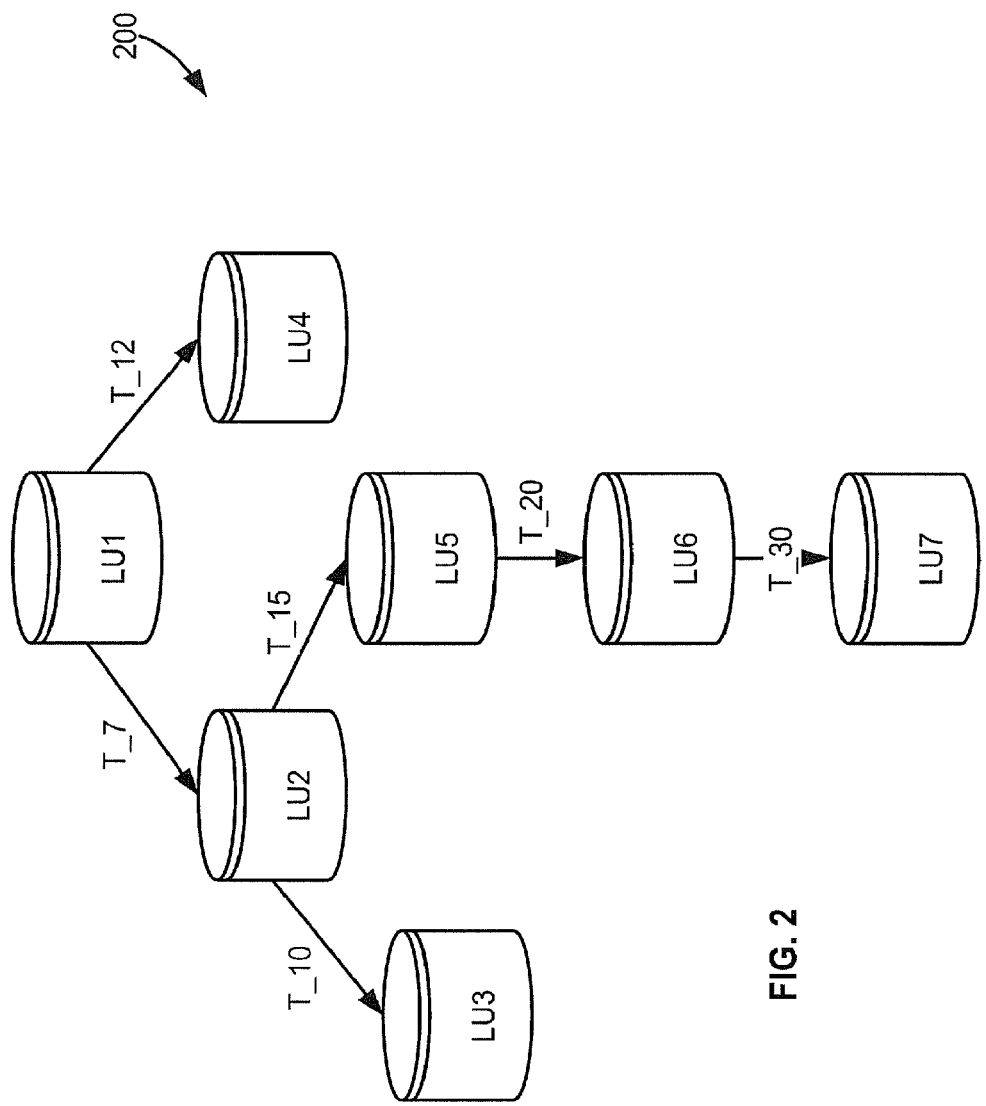
FIG. 2 is a schematic illustration of one example of a possible implementation of the volume-version data structure, according to examples of the presently disclosed subject matter.

Reference is now additionally made to FIG. 2, which is a schematic illustration of one example of a possible implementation of the volume-version data structure, according to examples of the presently disclosed subject matter. As can be seen in FIG. 2, each volume is associated with a respective volume ID (e.g., LU1, LU2, . . . , LUn). According to examples of the presently disclosed subject matter, each one of the volume IDs is unique within the volume-version data structure 200, and in case more than one volume-version data structures exist, the volume ID's can also be unique across the multiple volume-version data structures. In this regard, it should be appreciated that the addressing scheme that is used for identifying and marking the volumes is not limited to what is shown in FIG. 2 and described herein, and any other suitable addressing or identification schemes can be used in the storage system according to further examples of the presently disclosed subject matter.

The volume-version data structure 200 also records data for snapshot operations in which a source of the snapshot operations is a volume (a LU volume or a snapshot volume) from the volume-version data structure 200. The data that is recorded for each one of the snapshot operations includes an indication of a connection between a respective target volume and a source volume, and a timestamp for the snapshot operation. As an example, and as is shown for illustration in FIG. 2, the timestamp for the snapshot operation can be a logical timestamp, however it should be noted that any other appropriate timing marker can be used.

As mentioned above, according to examples of the presently disclosed subject matter, the snapshot layer can hold a plurality of volume-version data structures for unrelated sets of volumes. Further by way of example, each volume-version data structure can include data in respect of LU volume(s) and snapshot volumes which belong to the respective set of volumes and data in respect of snapshot operations which are associated the volumes in the set.

According to examples of the presently disclosed subject matter, a new volume-version data structure can be created when a new LU volume is created (e.g., by a volume create command). In case a tree data structure is used, as is the case in FIG. 2, the LU volume can be, for example, located at the root of the volume-version tree. However, it should be appreciated, that according to examples of the presently disclosed subject matter, in certain storage system implementations, a LU volume is not limited to appear only at the root of a volume-version data structure. For example, a certain LU volume can be restored at some point, from one of the snapshot LUs, and in such a case, the restoration operation can be recorded in the volume-version data structure in a manner similar to the recordation of snapshot operation, and in respect of the restoration operation, a volume entry can be added to the volume-version data structure, together with a timestamp for the restoration operation and an indication of a connection between the respective target volume (which is in this case the restored LU volume) and a source volume (in this case it is a snapshot volume). Further in response to a restore command, the volume entry for the volume which is being restored by the restore operation may be removed from the volume-version data structure. It would be further appreciated that in some examples of the presently disclosed subject matter, in case of a restoration operation, the target volume does not receive a new volume ID, and rather the volume ID of the volume that is being restored is used for the target volume. Thus, in case the target volume of the restoration operation is a LU volume, the target volume would be recorded in the volume-version data structure with the volume ID of the restored LU volume. In a similar manner, in case the target volume of the restoration operation is a certain snapshot volume, the target volume would be recorded in the volume-version data structure with the volume ID of the restored snapshot volume.

According to examples of the presently disclosed subject matter, when a snapshot volume is created (e.g., by a snapshot create command), data in respect of the new snapshot volume is added to the volume-version data structure. By way of example, the new snapshot volume can be a snapshot of the LU volume at the root of the volume-version data structure (the LU volume is the source of the snapshot operation) or a snapshot of a snapshot volume from the volume-version data structure, which in turn can be a snapshot of another snapshot volume, etc. When a snapshot volume which is associated with the volume-version data structure is created, a new node or entry representing the new snapshot volume (the target snapshot volume) is added to the volume-version data structure. For example, a volume ID representing the new snapshot volume can be added to the volume-version data structure. Additionally in response to the creation of the new snapshot volume, a timestamp for the snapshot operation and an indication of a connection between the target snapshot volume and the source volume is added to the volume-version data structure. For example, in response to a command to create a snapshot referencing a certain source volume (the source volume can be a LU volume or another snapshot volume) and a target volume, the following set of operations can be implemented: I/Os to the source volume can be suspended; a timestamp or counter can be incremented; data structures which are related to the snapshot operation can be updated, such as the respective volume-version data structure and possibly also the respective chunk version data structure; and the lock on the source volume can be released allowing the I/Os to the source volume to resume.

For example, in a tree format volume-version data structure such as shown in FIG. 2, when a snapshot command is received at the storage system, say a create snapshot command in which the source volume is LU1 and the target volume is LU2, a new node is added to the appropriate volume-version data structure. Thus for example, in FIG. 2, a node with the volume ID LU2 is added to the volume-version data structure 200. In the example of FIG. 2, the node for LU2 is added to the tree format volume-version data structure 200 by adding an edge from the source volume, which is LU1 in this case, to the new node LU2. This edge indicates that connection between LU2 (the snapshot target volume) and LU1 (the snapshot source volume). Further in the example of FIG. 2, the timestamp representing the logical time count that was obtained for the snapshot operation, which is in this case T_7, is assigned to the edge connecting LU2 to LU1.

According to examples of the presently disclosed subject matter, the snapshot layer is also capable of removing a volume. According to examples of the presently disclosed subject matter, removing a volume can involve, inter-alia, removing a node from the volume-version data structure, or marking the volume entry which is associated with the volume that is to be removed with an indication that the corresponding volume was removed.

According to examples of the presently disclosed subject matter, in case a certain volume is removed, the snapshot layer can be capable of freeing or updating any data or metadata that was kept in the storage system for the volume which was removed. This operation can be asynchronous with the removal of the volume from the volume-version data structure and can be carried out using any suitable reinstatement method known in the art. According to examples of the presently disclosed subject matter, various storage space redemption processes can be implemented in the storage system to determine when a volume is no longer in use (e.g., it has been deleted and there are no remaining references to the deleted volume), and the data in the volume version data structure in respect of the deleted volume can be deleted. By way of example, according to one possible implementation, the usage state of the various volume entries in the volume version data structure can be monitored and only when a certain volume is not referenced any more, the volume version data structure can be updated and the volume entry which is no longer in use can be deleted. Further by way of example, prior to the volume version data structure update the volume version entry for the deleted volume can exist (following the volume remove/delete command) but can only be referenced indirectly by reads from other snapshots that are directed to the deleted volume.

According to examples of the presently disclosed subject matter, when a revert or a restore command is received at the storage system, a new node can be added to the volume version data structure, and the new node receives the volume ID of a previously existing node in the volume version data structure. The new node can be connected to the node that is associated with the source volume of the revert or restore operation. Additionally in response to the revert or restore operation, a timestamp for the revert or restore operation and an indication of a connection between the target volume and the source volume is added to the volume-version data structure. According to examples of the presently disclosed subject matter, further in response to the revert or restore operation, the previous version of the volume that is associated with the volume ID which is the target of the revert or restore operation is marked as being invalid or removed.

It would be further appreciated that examples of the presently disclosed subject matter are not limited to the particular data-structure format illustrated in FIG. 2, and rather any suitable data structure can be used for storing the volume-version data mentioned herein.

It will also be appreciated that the snapshot layer 20 of the storage system 100 can include a volume-version controller (not shown) which can be associated with the volume-version data structure 122, and can be adapted to control various aspects of the operation thereof. For example the volume version controller can be configured to create a new volume-version data structure 122, for example in response to a volume create command, and can be responsive to update an existing volume-version data structure 122 when a create snapshot command is received. The volume-version controller can also be responsive to other commands which involve affecting changes (including creation and deletion) with respect to a volume-version data structure, including for example, a volume restore command and a volume delete or a volume remove command. In further examples of the presently disclosed subject matter, the functions of the volume-version controller can be carried out by the IO handler 126. The IO handler 126 can include or can be associated with one or more processors, and can include or be associated with one or more memory units. According to examples of the presently disclosed subject matter, the IO handler 126 can be configured to utilize the processing and memory resources to carry out the snapshot layer functions and operations described herein.

In addition the volume-version data structure 122, the snapshot layer 20 holds chunk-version data structures. For the purpose of illustration a single chunk-version data structure is shown in FIG. 1, and is referenced by the numeral 124. Each chunk-version data structure 124 is uniquely associated with a specific snapshot-layer chunk. As mentioned above, each snapshot-layer chunk can be associated with a unique volume ID and a logical chunk address (LCA) combination, and this combination can be used as the key for the respective chunk-version data structure. Thus, for a plurality of different logical chunk addresses of a given volume, a respective plurality of chunk-version data structures are kept in the storage system 100. Furthermore, for two LCAs in two different volumes (each of the different volumes has a different volume ID), two different chunk-version data structures are kept, even if the LCAs of the two snapshot layer chunks are the same. This is because each chunk version data structure is uniquely associated with a distinct snapshot layer chunk, which is in turn associated with a unique volume ID and LCA combination.

Each chunk-version data structure 124 holds one or more chunk-version data elements. Each chunk-version data element can be stored in any data container in any suitable form or structure. Each chunk-version data element is associated with a specific chunk-version data structure 124.

Each chunk-version data element includes a timestamp at a corresponding write to the respective snapshot layer chunk and a pointer to storage resources in the storage layer 30 that are associated with the chunk-version data element. By way of example, a given chunk-version data structure 124 can have a plurality of chunk-version data elements, where each one of the plurality of chunk-version data elements is a distinct data container that, in addition to being associated with the snapshot layer chunk with which the respective chunk-version data structure 124 is associated, provides a timestamp and a reference or a pointer to storage resources, where the timestamp indicates the time of a corresponding write to the respective snapshot layer chunk, and the reference to the storage resources indicates the storage resource in the storage layer 30 that were allocated and are used for storing the respective write data in the storage layer. Thus, according to examples of the presently disclosed subject matter, given a certain volume ID and LCA combination and a certain timestamp at a write operation to the corresponding snapshot layer chunk, data with regard to the storage layer resources that were allocated and which are used for storing in the storage layer the respective write data can be obtained. More details about the chunk-version data structure 124 and about the chunk-version data elements are provided below.

According to examples of the presently disclosed subject matter, a dedicated chunk-versioning controller (not shown) may be provided and can be implemented as part of the snapshot layer 20 of the storage system 100 for controlling and/or carrying out the various functions and/or operations involving the chunk-version data structures 124, or as is shown in FIG. 1 and according to further examples of the presently disclosed subject matter, the IO handler 126 can be configured to control and/or carry out such functions and/or operations.

According to examples of the presently disclosed subject matter, the central controller 10 can be capable of controlling the operation of the storage system 100 and its components. According to examples of the presently disclosed subject matter, the central controller 10 can include a processor and computer memory (not shown) and can control the flow of data to and from each of the interface 40, the snapshot layer 20 and the storage layer 30.

Figure 3:
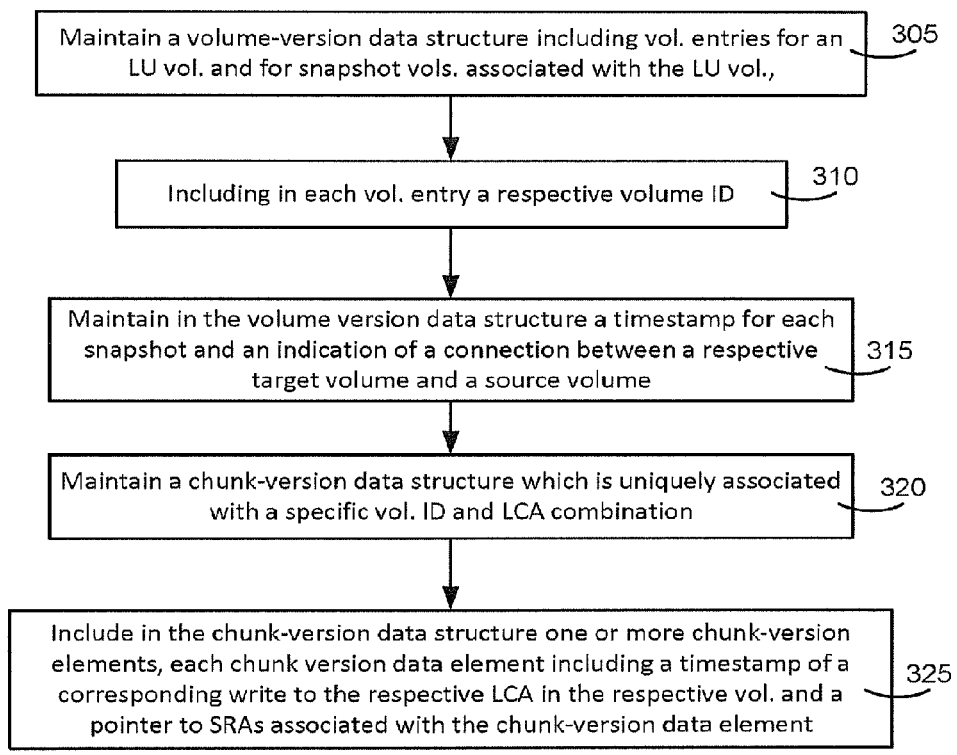
FIG. 3 is a flowchart illustration of method of managing a storage system, according to examples of the presently disclosed subject matter.

Reference is now made to FIG. 3, which is a flowchart illustration of method of managing a storage system, according to examples of the presently disclosed subject matter. It would be appreciated that the method shown in FIG. 3 and described herein with reference thereto can be, but is not necessarily, implemented by the storage system shown in FIG. 1.

According to examples of the presently disclosed subject matter, a volume-version data structure can be maintained in the snapshot layer of the storage system, including volume entries for an LU volume and for snapshot volumes which are associated with the LU volume (block 305). In association with each volume entry, a respective volume ID can be maintained (block 310), and for each snapshot operation, a timestamp of the snapshot operation and an indication of a connection between a target volume and a source volume of the snapshot operation can be stored in the volume-version data structure (block 315). As mentioned above, in accordance with examples of the presently disclosed subject matter, within each volume-version data structure, each one of a plurality of volume IDs is unique, and in some implementations the volume IDs can also be unique across the storage system.

According to examples of the presently disclosed subject matter, a chunk-version data structure can also be maintained in the snapshot layer of the storage system. As mentioned above, a plurality of chunk-version data structures can be maintained, and each chunk-version data structure can be associated with a specific snapshot layer chunk which is referenced by a respective unique combination of a volume ID and a logical chunk address (block 320).

A chunk-version data structure can include one or more chunk-version data elements, each chunk-version data element including a timestamp at a corresponding write to the respective logical chunk address in the respective volume and a reference to storage layer resources which were allocated for storing the respective write data in the storage layer (block 325).

Figure 4:
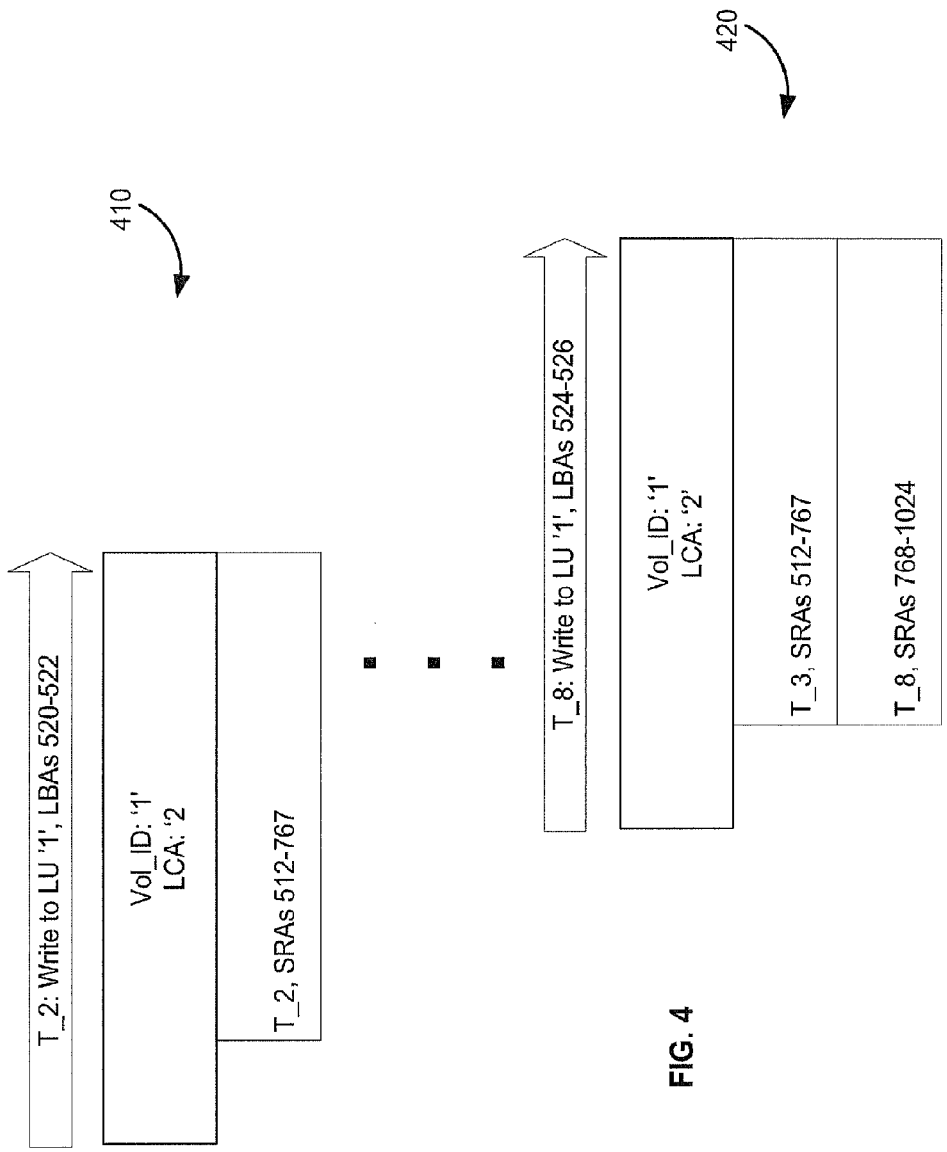
FIG. 4 is a graphical illustration of a chunk-version data structure, and the chunk-version data elements contained therein at two different time instants, according to examples of the presently disclosed subject matter.

More details with respect to the chunk-version data structure and the chunk-version data elements are now provided with reference to FIG. 4, which is a graphical illustration of a chunk-version data structure, and the chunk-version data elements contained therein at two different time instants, according to examples of the presently disclosed subject matter. For the sake of illustration, the scenario depicted in FIG. 4 corresponds with the volume-version data structure shown in FIG. 2. In FIG. 2 the volume which is associated with volume ID LU1 is created at T_0. As mentioned above, in response to the volume create command, the snapshot layer can create a volume-version data structure and record in the volume-version data structure the volume ID of the new volume (LU1). Since this is the first volume in the volume-version data structure, LU1 is located at the root of the data structure (in case a tree data structure is used). This operation can be managed and controlled by an IO handler (referenced 126 in FIG. 1), which is implemented in the snapshot layer 20 or, in a further example, by a dedicated volume-version controller.

According to the example scenario depicted in FIG. 4, when the counter is at T_2, a write command is received in the storage system. The write command references LU1 and LBAs 520-522. According to examples of the presently disclosed subject matter, each LBA is 8 bytes in size, and each chunk is 128 kb in size. Thus, the snapshot layer determines that the write command is associated with LCA2 in volume LU1. According to examples of the presently disclosed subject matter, the snapshot layer 20 (e.g., using the IO handler) can determine whether there is an existing chunk-version data structure for <LU1, LCA2>. If necessary, a data structure for LCA2 in volume LU1 can be created.

At instant 410, the chunk-version data structure for LCA2 in volume LU1 includes a chunk-version data element with the timestamp T_2 and a reference to SRAs 512-767. According to examples of the presently disclosed subject matter, the chunk-version data structure for LCA2 in volume LU1 can be created when the first write command referencing LCA2 in volume LU1 (or associated therewith) is received at the storage system, however, in other examples the chunk-version data structure can be created in advance, for example, when the volume (in this case LU1) is created.

The handling of write commands in the storage system is discussed further below, however, for the sake of illustration, it is to be noted that at some point after the creation of LU1, a write command which is addressed to LU1 may be received at the storage system, and in this case the write command references LBAs 520-522 in LU1. Further by way of example, the snapshot layer 20 (e.g., the IO handler) can receive the write command and determine that it is associated with LCA2 in volume LU1. Some details in respect to the handling of writes in the snapshot layer are discussed below, however, as can be seen in FIG. 4, when it is determined that the write command is associated with the snapshot layer chunk that is referenced by the key <LU1, LCA2>, a chunk-version data element which is associated with the write command is included in the respective volume-version data structure (the one that is associated with the key <LU1, LCA2>), or in some cases an existing chunk version data element is overwritten with data related to the current write command, as will be further described below.

The chunk-version data element includes the timestamp T_2, which is the timestamp that was read from the counter when the write command was received at the snapshot layer. According to examples of the presently disclosed subject matter, the counter is a logical counter which is incremented by operations concerning volumes, for example, by operations which affect or modify the data in the volume-version data structure. The chunk-version data element also includes a reference or a pointer to storage layer blocks 720-728 which were allocated for storing the respective write data. The allocation of storage layer blocks for a given write command and the mapping between logical blocks, snapshot layer chunks and storage layer blocks is further discussed below.

Also shown in FIG. 4 by way of illustration, is the same volume-version data structure at a different time (instant 420). At time instant 420, the volume-version data structure associated with LCA2 in LU1 includes two volume-version data elements. The first data element has the timestamp T_3 and references (or points to) SRAs 640-648. The second data element has the timestamp T_8 and references SRAs 512-520.

The first chunk-version data element at time instant 420 (the one which has the timestamp T_3), overwrote the chunk-version data element which previously existed in the chunk-version data structure (which had the timestamp T_2). The second chunk-version data element at time instant 420 (the one which has the timestamp T_8) exists in the chunk-version simultaneously with the first chunk-version data element, and among these two chunk-version data elements an overwrite operation was not appropriate. When the data in a previous (according to its timestamp) chunk-version data element is needed by a snapshot volume (or volumes) which is a direct or an indirect snapshot of the volume with which the chunk-version data structure (or the chunk-version data elements) are associated, the previous chunk-version data element can be maintained, and will not be overwritten by the chunk-version data element. The management of the chunk-version data structure, including examples of management logic that can be used to determine when to overwrite existing chunk-version data elements, and when to retain multiple chunk-version data elements in a given chunk-version data structure, shall be further described below.

The chunk-version data structure at instant 420 serves as an example of a chunk-version data structure which has a plurality of chunk-version data elements. It should be appreciated that a chunk-version data structure can include any number of chunk-version data elements from 1 to n, at any given instant. In some examples of the presently disclosed subject matter, a chunk-version data structure which has no (0) chunk-version data elements can exist, for example when the operation which removes empty chunk version data structures (e.g., could be referred to as a "chunk free" operation) is a lazy background operation.

According to examples of the presently disclosed subject matter, the chunk-version data structure, together with the volume-version data structure, can be used to enable or support IO operations (or some IO operations) in a storage system which implements snapshot volumes, as will be further described below.

Figure 5:
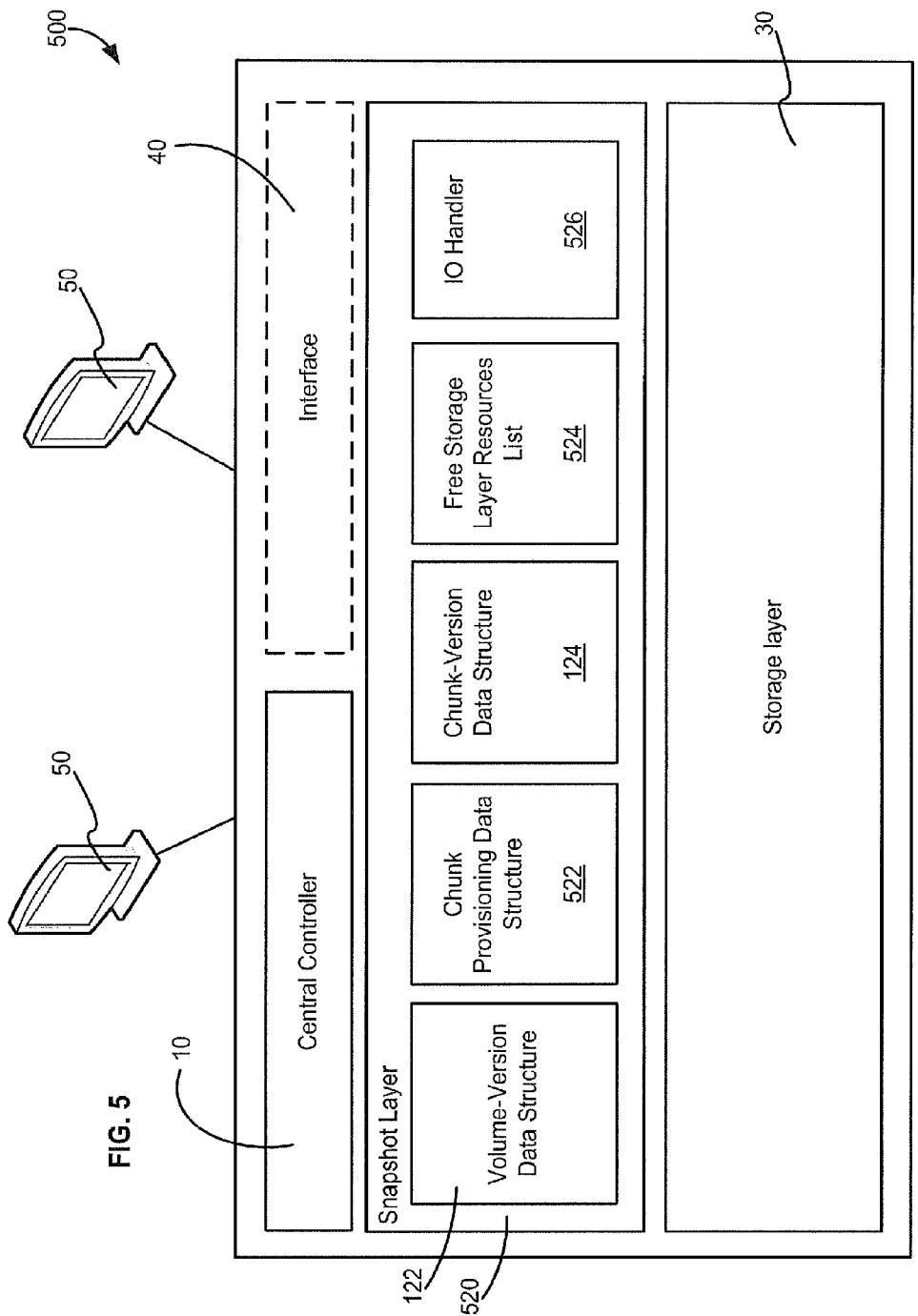
FIG. 5 is a block diagram illustration of a storage system which includes a snapshot layer for supporting and managing snapshot volumes and data versioning.

Reference is now made to FIG. 5, which is a block diagram illustration of a storage system which includes a snapshot layer for supporting and managing snapshot volumes and data versioning. According to examples of the presently disclosed subject matter, the snapshot layer 520 can include, in addition to the IO handler 526, the volume-version data structure 122 and chunk-version data structure 124, a chunk-provisioning data structure 522 and a free storage layer resources list 524.

According to examples of the presently disclosed subject matter, the free storage layer resources list 524 can hold a list of the currently available storage layer addresses (SRAs), e.g., storage layer blocks, which can be allocated to snapshot layer chunks versions. The free storage layer resources list 524 can be a dynamic list, and can provide an up to date image of the availability of storage layer resources which can be allocated to snapshot layer chunks versions. Still further by way of example, each entry in the free storage layer resources list 524 can relate to a certain set of SRAs which corresponds in size to a snapshot layer chunk. Thus, when a new version of a snapshot layer chunk is created, data in respect of a free chunk of storage layer resources which corresponds in size to the snapshot layer chunk can be selected from the free storage layer resources list 524, and can be allocated to the newly created snapshot layer chunk version. As was explained above, according to some examples of the presently disclosed subject matter, and in some circumstances, a given snapshot layer chunk can have more than one version (e.g., two, three, . . . , n versions), and different storage layer resources can be allocated to each different version of the same snapshot layer chunk.

For example, the storage layer chunks in the free storage layer resources list 524 can be enumerated (e.g., from 1 to n), with each storage layer chunk being associated with a corresponding set of storage layer blocks of a certain size. Still further by way of example, the association between storage layer chunks and SRAs can be such that the first storage layer chunk is associated with the first set of consecutive SRAs of the predetermined size in the storage space, the second to the storage layer chunk is associated with the second set of SRAs in the storage space, etc. In this configuration a mapping table or a mapping function are not needed to determine the relation between storage layer chunks in the free storage layer resources list 524 and the SRAs in the storage layer. However, in further examples, a mapping table or function may be required, or alternatively the free storage layer resources list 524 can use SRA ranges instead of storage layer chunks, thus directly linking snapshot layer chunks with corresponding SRAs.

It should be noted, that according to examples of the presently disclosed subject matter, that the storage layer blocks can be associated with validity status indications, e.g., validity status bits, and for the storage layer blocks which are associated entries in the free storage layer resources list 524 (e.g., with a storage layer chunk in the free storage layer resources list 524), the validity status bits have an 'invalid' value, assuming that the free storage layer resources list 524 maintains data only for 'free' storage layer resources.

According to examples of the presently disclosed subject matter, when storage layer resources are allocated to a certain snapshot layer chunk version, the free resource list 524 can be updated to reflect the allocation. Thus for example, in case storage layer chunks are used, the serial number which represents a free storage layer chunk can be removed from the free storage layer resources list 524 when that storage layer chunk is allocated to some snapshot layer chunk version (and thus ceases to be free). In a further example, the record for the now allocated storage layer chunk can be kept in the free storage layer resources list 524 after it is allocated, and an indication can be added in association with the allocated storage layer chunk record which indicates that this chunk is not free (or is allocated). Further by way of example, the indication can include a reference to the snapshot layer chunk version to which the storage layer chunk was allocated. For example, the reference to the snapshot layer chunk version to which the storage layer chunk was allocated can include the respective volume ID and LCA combination, and the timestamp that is associated with the respective snapshot layer chunk version.

It would be appreciated that the term list as used herein as part of the expression free storage layer resources list is not intended to limit or bound the form or structure of the data container, and that any suitable data container can be used to record, track and manage the data in respect of the free storage layer resources.

According to examples of the presently disclosed subject matter, the chunk provisioning data structure 522 is capable of maintaining for each allocated snapshot layer chunk a pointer or pointers to the storage layer resources that were allocated to that snapshot layer chunk. As mentioned above, according to examples of the presently disclosed subject matter, the free storage layer resources list 524 can be implemented as a list of storage layer resources which are available for allocation to snapshot layer chunks versions, and whenever storage layer resources are allocated, the corresponding data is removed from the free storage layer resources list 524. The chunk provisioning data structure 522 can be used to determine which storage layer resources were allocated to which snapshot layer chunks versions.

As was also mentioned above, several different versions (e.g., two, three, . . . , n versions) of a given snapshot layer chunk can exist simultaneously, and the chunk provisioning data structure 522 can be capable of maintaining a pointer or pointers to the storage layer resources that were allocated to each version of a given snapshot layer chunk, in case there are multiple versions of the snapshot layer chunk.

Still further by way of example, the chunk provisioning data structure 522 can be organized in the form of a hash table. The hash table key can include a combination of an LCA and a volume ID. Thus, according to the mapping scheme described above, given a volume ID and LBA address, the hash table key that is used by the chunk provisioning data structure 522 can be determined. According to examples of the presently disclosed subject matter, each hash table entry that is associated with a given key can point to the chunk-version data structure that is associated with the respective <volume ID, LCA> combination.

Further by way of example, for each snapshot layer chunk version, the pointer or pointers to the storage layer resources which were allocated to this snapshot layer chunk version are maintained in the corresponding chunk-version data element. Thus, when multiple versions (two, three, . . . , n versions) of the same snapshot layer chunk exist, the chunk provisioning data structure 522 together with the chunk-version data structures and the chunk-version data elements can be used to determine which storage layer resources are associated with each version of a given snapshot layer chunk.

Further by way of example, when a write command is received at the storage system, the IO handler (or any other control module) in the snapshot layer can search the chunk-version data structure (e.g., through the chunk provisioning data structure) as part of the handling of the write command in the storage system. The search can return a null result, for example, when there is no current version of the snapshot layer chunk for which storage layer resources were allocated. In such a case, according to examples of the presently disclosed subject matter, the IO handler can be configured to request an allocation of storage resources from the free storage layer resources list 524 for the respective snapshot layer chunk. It should be appreciated, that according to some examples of the presently disclosed subject matter, allocation of storage resources from the free storage layer resources list 524 can also be required when there are already one or more versions of the relevant snapshot layer chunk, but an additional version of the snapshot layer chunk is to be created.

It would be appreciated that searching the chunk provisioning data structure 522 hash table for a chunk-version data structure that is associated with a given <volume ID, LCA> key can yield relatively good access times. Adding an additional key for a newly allocated chunk-version data structure can also be relatively straightforward and efficient. In this regard, using a hash table for this application favors performance over storage space. However, it should also be appreciated that examples of the presently disclosed subject matter are not limited to this particular form of data structure, and that the chunk provisioning data structure 522 and the manner by which it is organized and used with the chunk-version data structures can be otherwise implemented.

There is now provided a description of the use of the chunk provisioning data structure 522 and the free storage layer resources list 524, according to one example of the presently disclosed subject matter. In this example, it assumed that the storage layer implements a 512 bytes accessible sectors size, and 4 KB management segments (e.g., this is the granularity of the validity data), and the snapshot layer implements 128 KB snapshot layer chunks.

The chunk provisioning data structure 522 thus holds a list of free 128 KB storage layer chunks, and the IO handler 526 can obtain such 128 KB storage layer chunks for newly allocated snapshot layer chunks or for new versions of an existing snapshot layer chunks. The actual writing of the data in the storage layer is carried out in segments.

In one example, assume a write command is received at the storage system referencing blocks 520-535 in LU1 (SCSI address). The IO handler converts the SCSI address by rounding down the LBA to LCA (logical chunk address). Assuming that storage resources were not previously allocated to this snapshot layer chunk, or that the allocated resources should not be overwritten by the current write, the chunk provisioning data structure 522 may return a null. In response to the null from the chunk provisioning data structure, the IO handler 526 may request a chunk allocation from the free storage layer resources list 524. By way of example, the free storage layer resources list 524 may return a reference to a free storage layer chunk. The free storage layer chunk can be simply a number—in case the IO handler is preconfigured to determine a set of storage segments from a chunk number. Another alternative is that the free storage layer resource list returns the segments addresses or the storage layer block addresses which are associated with the selected storage layer chunk. Any other scheme for pointing towards the storage layer resources can be used. Still further by way of example, the IO handler 526 may send an insert command to the chunk provisioning data structure 522. For example a command similar to the following can be used: insert key="<LU1, LCA2>, value=#3", instructing the chunk provisioning data structure 522 to add to the appropriate chunk-version data structure 124 a chunk-version data element which references the storage layer chunk referenced "3". Further by way of example, the IO handler 526 can now write the data to the allocated storage layer chunk. The IO handler 526 may compute the segments in the storage layer which correspond to the storage layer chunk that was allocated for the write command. For example, the IO handler 526 can be adapted to determine the relative location of the segments which are associated with the logical block addresses referenced in the write command within the chunk (snapshot layer chunk or storage layer chunk). For example, assuming 128 kb chunks, 4 kb segments, and 512 bytes LBAs, for blocks 520-535, when the allocated chunk is #3 (the third chunk counted from the start of block 1), segments (1,2) in chunk #3 should be used, which translates to segments 97 and 98 in the storage layer 30. Upon receiving the write command, the storage layer 30 will write the data to the specified segments and will mark the relevant segments as valid (each segment write and validity status update are carried out as a single atomic operation). Once the write is completed successfully, the storage layer 30 sends an ACK to IO handler 526 in the snapshot layer 520, and in response the IO handler 526 sends an ACK to the initiator of the write command.

Further by way of illustration, another example of the use the chunk provisioning data structure 522 and the free storage layer resources list 524 is now provided with reference to scenario illustrated in FIG. 4. In response to the write command at instant 410 (associated with timestamp T_2), the IO handler converts the SCSI address by rounding down the LBA to LCA (logical chunk address), and it is thus determined that the write command is associated with LCA2 in LU1. In this example, it is assumed that the chunk provisioning data structure returned a null for this write command indicating that storage resources were not previously allocated to this snapshot layer chunk, and in response, the free storage layer resources list allocated free storage layer blocks. In FIG. 4, the storage layer resources are allocated as a set of consecutive storage layer blocks which correspond in size to a snapshot-layer chunk. Further by way of example, for the chunk-version data element shown at instant 410 (associated with timestamp T_2), the free storage layer resources list allocated blocks 512-767 (256 blocks, each 512 bytes and size, for a 128 KB chunk). The IO handler updated the chunk provisioning data structure, and at instant 410, the chunk-version data structure includes a data element that includes a timestamp that indicates the state of the counter at the time when the respective write command was received (in this case T_2) and a reference to the storage layer resources which are associated with this chunk-version data element (blocks 512-767).

Further with reference to the example in FIG. 4, when the counter is showing T_3 another write which is also associated with <LU1, LCA2> was received and processed by the snapshot layer. In the case of this write command, no further allocation of resources from the free storage layer resources list was necessary, because it was determined that the chunk-version data element which is associated with the write at timestamp T_3 should update and/or overwrite the chunk-version data element that is associated with a write at timestamp T_2, and the storage layer resources that were allocated to the chunk-version data element that was associated with timestamp T_2 should be referenced by the chunk-version data element which is associated with timestamp T_3. By way of example, the write data of the write command received when the counter was at T_3 can be used to update and/or overwrite the data in the storage layer resource that were allocated to the overwritten chunk-version data element. Further by way of example, if the write data in the write command that is associated with T_3 overlaps with some (or all) of the write data that was previously stored in the storage resources that are allocated to the chunk-version data element, the new write data will overwrite the existing data. Any non-overlapping data is used to update the allocated storage resources (there is no old data there to overwrite).

Still further with reference to the example in FIG. 4, another write which is associated with <LU1, LCA2> was received and processed by the storage system. This write command was received when the counter registered T_8, and so it received the timestamp T_8. In the case of this write command, the IO handler determined that an overwrite of the existing chunk-version data element (the one associated with T_3) is not appropriate, and a new chunk-version data element should be created. The IO handler thus requests an allocation of storage layer resources from the free storage layer resources list. By way of example, for the chunk-version data element that is associated with timestamp T_8, the free storage layer resources list allocated blocks 768-1023. The IO handler updates the chunk provisioning data structure, and at instant 420, the chunk-version data structure includes in addition to the chunk-version data element associated with the timestamp T_3, a chunk-version data element that is associated with timestamp T_8, and each of the two chunk-version data elements is associated with a different set of storage layer blocks in a size which corresponds to a snapshot layer chunk. It would be appreciated that the size of the different units, the particular timestamp values, the particular addresses and the number of chunk-version data elements in the chunk-version data structure are all provided by way of non-limiting example, and can be substituted with any appropriate units, values, addresses or numbers.

According to a further aspect of the presently disclosed subject matter, there is provided a method of handling writes in a storage system. According to examples of the presently disclosed subject matter, the method of handling writes in a storage system can include: maintaining a volume-version data structure including volume entries for a LU volume and for snapshot volumes associated with the LU volume, wherein for each volume a respective volume ID is kept, and for each snapshot a timestamp for the snapshot operation and an indication of a connection between a respective target volume and a source volume are kept; maintaining chunk-version data structures, each of which is uniquely associated with a respective snapshot-layer chunk, and each of which includes one or more chunk-version data elements, wherein each chunk-version data element includes a timestamp at a corresponding write to the respective snapshot-layer chunk and a pointer to storage resources associated with the chunk-version data element; when a write command that is associated with an existing chunk-version data structure is received, reading a timestamp of a last chunk-version data element in the existing chunk-version data structure, and if there is a snapshot operation whose source is the volume referenced in the write command and this snapshot operation is associated with a timestamp that is later than the timestamp of the last chunk-version data element, maintaining the last chunk-version data element and adding to the existing chunk-version data structure a new chunk-version data element for the write command. According to further examples of the presently disclosed subject matter, if there is no snapshot operation whose source is the volume referenced in the write command, or if all snapshot operations (e.g., one or two or N snapshot operations) whose source is the volume referenced in the write command have a timestamp that is earlier than or equal to the timestamp in the last chunk-version data element, the IO handler is configured to determine that the last chunk-version data element in the existing chunk-version data structure can be overwritten.

For sake of clarity, it should be noted that FIGS. 1-5 and the description thereof which was provided above, should be regarded, according to examples of the presently disclosed subject matter, as part of the description of the method of handling writes in a storage system, which is now described. It should be further noted that the method of handling writes in a storage system can be implemented in a storage system that is designed and managed according to the disclosure provided hereinabove, including with reference to FIGS. 1-5. In further examples of the presently disclosed subject matter, the system for handling writes in a storage system is not limited by some or all of the teachings provided above, in particular with reference to FIGS. 1-5.

It should also be noted that in some examples of the presently disclosed subject matter, the method of handling writes in a storage system can be implemented in conjunctions with the teachings provided above, in particular with reference to FIGS. 1-5. In further examples of the presently disclosed subject matter, the method of handling writes in a storage system is not limited by some or all of the teachings provided above, in particular with reference to FIGS. 1-5.

Figure 6:
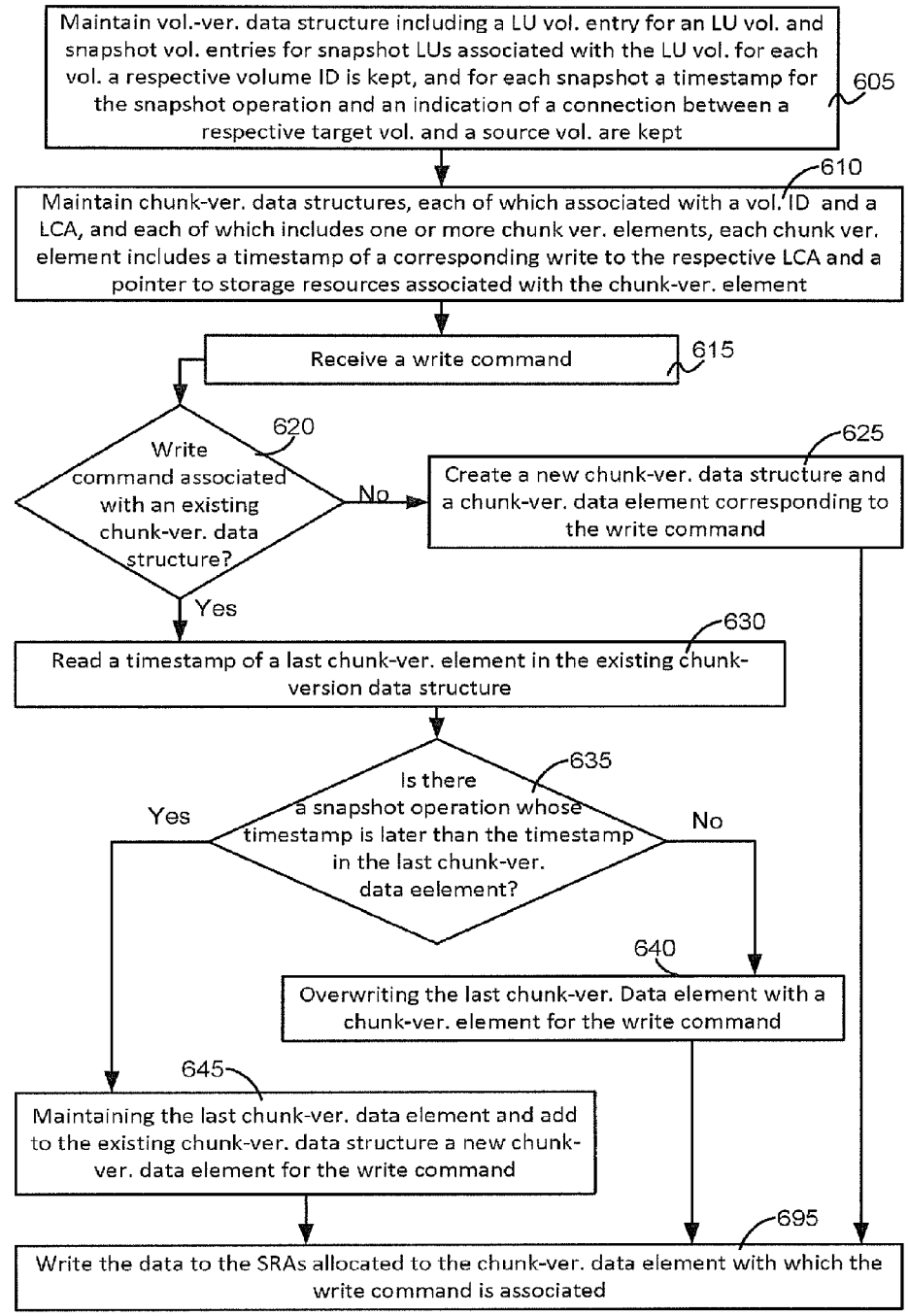
FIG. 6 is a flowchart illustration of a method of handling writes in a storage system, according to examples of the presently disclosed subject matter.

Reference is now made to FIG. 6, which is a flowchart illustration of a method of handling writes in a storage system, according to examples of the presently disclosed subject matter. Further by way of example, the method laid out in FIG. 6 can be implemented by the storage system shown in FIG. 1 and described above. Still further by way of example, the method laid out in FIG. 6 can be implemented by the storage system shown in FIG. 5 and described above. Accordingly, by way of non-limiting example, the description of FIG. 6 is made with additional reference to the storage system shown in FIG. 1 or with reference to the storage system shown in FIG. 5.

According to examples of the presently disclosed subject matter, a snapshot layer 20 of the storage system 100 can maintain a volume version data structure 122, that includes volume entries for an LU volume and for snapshot volumes associated with the LU volume, wherein for each volume a respective volume ID is kept, and for each snapshot a timestamp for the snapshot operation and an indication of a connection between a respective target volume and a source volume are kept (block 605). By way of example, a tree data structure can be used. Further by way of non-limiting example, the volume version data structure 122 can be implemented in a manner that is similar to the one illustrated in FIG. 2 and described above with reference to FIG. 2, however any other suitable data structure can be used.

Resuming the description of FIG. 6, according to examples of the presently disclosed subject matter, the snapshot layer 20 of the storage system 100 can further maintain chunk-version data structures 124, each of which is associated with a particular snapshot-layer chunk, and each of which includes one or more chunk-version data elements.

According to examples of the presently disclosed subject matter, each chunk-version data structure can be associated with and referenced by a unique volume ID and logical chunk address combination, and each chunk-version data element includes a timestamp at a corresponding write to the respective logical chunk address and a pointer to storage resources associated with the chunk-version data element (block 610). Examples of chunk-version data structures, and chunk-version data elements and the use thereof in managing of snapshot volumes and data versioning were discussed above with reference to FIGS. 1-5 and should be regarded, according to examples of the presently disclosed subject matter, as part of the description of the method of handling writes in a storage system.

At some point, a write command can be received by the storage system 100. As mentioned above, the write command can be received at the storage system 100 (block 615) through an interface 40, and is passed (possibly after some processing at the interface 40) to the snapshot layer 20.

According to examples of the presently disclosed subject matter, upon receiving the write command at the snapshot layer 20, the IO handler 126, which is configured to control the processing of the write command in the snapshot layer 20, can be configured to determine whether the write command is associated with an existing chunk-version data structure (block 620).

According to examples of the presently disclosed subject matter, each write command references a certain logical address. Further by way of example, each write command references a certain logical unit (or volume) and a logical block or blocks to which it relates. For example, assuming the storage system supports the SCSI storage protocol, a write command would include a reference to a logical unit (LU) and a LBA or a range of LBAs where the data in the write command should be saved. Since the address provided to the storage system is a logical address, the actual storage location of the data can have a different address, but the storage system maintains a mapping of logical storage addresses (e.g. snapshot-layer chunks) and the corresponding actual storage locations where the data is stored in the storage system. As mentioned above, more than one virtualization level can be implemented, in which case additional layer of logical addresses are implemented and further mapping functions, table or other means are used.

As mentioned above, the snapshot layer 20 can implement snapshot layer chunks. Each snapshot layer chunk can be referenced by a unique combination of a LCA address (e.g., a number) and volume ID (for example, the logical unit number referenced in the write command). The snapshot layer 20 is configured to translate LBAs in a given volume to a respective LCA (or LCAs) in the volume. As mentioned above, for example, the LBAs can be numerical and range from 1-n, and the corresponding LCA can be derived by rounding down of the LBA address to the nearest LCA.

It would be appreciated that a given write command can reference a logical address range which is associated with more than one snapshot layer chunk (e.g. two, three, . . . n snapshot layer chunks). It should be noted that the process described herein can be implemented with respect to the entire logical address range, by repeating the process for each one of the snapshot layer chunks with which the write command is associated, or carrying out multiple instances of the process in parallel. For simplicity, and by way of non-limiting example, the below description assumes that the write command is associated with one snapshot layer chunk.

According to examples of the presently disclosed subject matter, as part of determining whether the write command is associated with an existing chunk-version data structure, the IO handler 126 can search for a chunk-version data structure 124 that is associated with the volume ID and with the logical chunk address with which the write command is associated. For example, in case each chunk-version data structure 124 in the snapshot layer 20 is associated with a <volume ID, LCA> combination, the IO handler 126 can search for a chunk-version data structure 124 that is associated with the <volume ID, LCA> with which the write command is associated.

Still further by way of example, the storage system implementing the method of handling writes can have a structure that is generally similar to the storage system 500 shown in FIG. 5 and described above with reference thereto. The snapshot layer 20 of the storage system 500 can further include a chunk provisioning data structure 522, in which case, in response to receiving a write command, the IO handler 126 can be configured to search the chunk provisioning data structure 522 to determine whether the write command is associated with an existing chunk-version data structure. As described above, the chunk provisioning data structure 522 can, for example, be implemented as a hash table in which the keys are unique <volume ID, LCA> combinations which are associated with snapshot layer chunks for which storage resources in the storage layer 30 were allocated. By way of example, at least in the implementation of the storage system 500 shown in FIG. 5, an existing chunk-version data structure is one for which storage resources in the storage layer 30 were allocated. Thus, according to examples of the presently disclosed subject matter, to determine whether a given write command is associated with an existing chunk-version data structure, the IO handler 526 can search the hash table 522 using the volume ID and the logical chunk address with which the write command is associated. Yet further by way of example, if the search returns 'null' or a corresponding result, the IO handler 526 can conclude that the write command is not associated with an existing snapshot-layer chunk.

According to examples of the presently disclosed subject matter, if the IO handler 526 concludes that the write command is not associated with an existing snapshot layer chunk, the IO handler 526 can be configured to create a new chunk-version data structure 124 and a chunk-version data element corresponding to the write command (block 625).

The chunk-version data structure 124 will be associated with the volume ID and LCA with which the write command is associated and the volume version data elements shall include a timestamp which corresponds to the state of the counter at the time when the write command was received and the storage-layer resources that were allocated for this version of the snapshot-layer chunk. The IO handler 526 can then proceed to instruct the storage layer 30 to write the write data to the storage-layer resources that were allocated for the write command (block 695).

The creation of a new chunk-version data structure 124 and a chunk version data element were discussed above. In brief, and by way of example, the IO handler 526 can be configured to determine with which snapshot layer chunk the write command is associated, and can add a chunk-version data structure 124 whose key is associated with the snapshot layer chunk with which the write command is associated. For example, the chunk-version data structure can have a key that is comprised of a combination of the volume ID and the logical chunk address of the snapshot-layer chunk.

The IO handler 526 can then add in connection with the write command a new chunk-version data element to the new chunk-version data structure 124. The chunk-version data element includes a timestamp which corresponds to the state of the counter at the time when the write command was received and a pointer to storage layer resources that were allocated for storing the write data in the storage layer 30.

According to examples of the presently disclosed subject matter, as was mentioned above, the storage system 500 can include a chunk-provisioning data structure 522 and a free storage layer resources list 524, and when a write command is received at the storage system 500, the IO handler 526 can be configured to search for an existing chunk-version data structure 124 that is associated with the write command using the chunk-provisioning data structure 522. If storage layer resources were previously allocated to the snapshot layer chunk with which the write command is associated, the chunk-provisioning data structure 522 will include an entry for that snapshot layer chunk, otherwise, the search will return a null result, indicating that the respective snapshot layer chunk does not exist, or is not initiated or allocated yet.

According to examples of the presently disclosed subject matter, in case the search returned a null, the IO handler 526 can be configured to request the free storage layer resources list 524 to allocate resources to the snapshot layer chunk with which the write command is associated. The IO handler 526 can be configured to add to the chunk provisioning data structure 522 an entry for the snapshot layer chunk with which the write command is associated, and create a new chunk-version data structure 124 which is associated with the new key in the chunk provisioning data structure 522. The IO handler 126 can be configured to add to the chunk-version data structure 124 a chunk-version data element that includes a timestamp that indicates the state of the counter at the time when the write command was received and a pointer to the storage resources that were allocated for storing the write data in the storage layer 30.

Returning now to the description of FIG. 6, in case at block 620 it was determined that there is an existing chunk-version data structure 124 for the snapshot layer chunk that is associated with the write command, the IO handler can be configured to read a timestamp in a last chunk-version data element in the existing chunk-version data structure 124 (block 630).

The IO handler 526 can then be configured to determine whether there was a snapshot in which the volume referenced in the write command is a source volume and in which the timestamp associated with the snapshot operation is later than the timestamp in the last chunk-version data element (block 635). According to examples of the presently disclosed subject matter, in order to determine whether there was a snapshot in which the volume referenced in the write command is a source volume, and if such a snapshot exists, whether the timestamp associated with such at least one such snapshot operation is later than the timestamp in the last chunk-version data element, the IO handler 526 can search the volume-version data structure 122 for volume entries which are connected to the volume referenced in the write command, where the volume referenced in the write command is a source of a snapshot operation, and where the timestamp for the snapshot operation is later than the timestamp in the last chunk-version data element. For example, assuming volume-version data structure 122 has a tree format, the search can be carried out with respect to child nodes of the node that is associated with the volume referenced in the write command (which can be regarded as the parent node), and the timestamp on each connector, which connects the parent node and its children node, is read to determine if there is a snapshot operation where the timestamp for the snapshot operation is later than the timestamp in the last chunk-version data element.

According to examples of the presently disclosed subject matter, in case it is determined that there is no record (in the volume-version data structure) of a snapshot operation where the source volume is the volume referenced in the write command, and where the timestamp for the snapshot operation is later than the timestamp in the last chunk-version data element in the chunk-version data structure 124 that is associated with the snapshot layer chunk with which the write command is associated, then the IO handler 526 can be configured to overwrite the last chunk-version data element in the chunk-version data structure 124 that is associated with the snapshot layer chunk with which the write command is associated (block 640). It would be appreciated that in case there is not any snapshot (at all) in which the volume referenced in the write command is a source volume, the process also proceeds from block 635 to block 640.

In further examples of the presently disclosed subject matter, in connection with determining whether a chunk-version data element should overwrite an existing volume-version data structure or not, the IO handler 526 can be configured to search for a snapshot operation whose source is the volume referenced in the write command, and if there is no such snapshot (a snapshot whose source is the volume referenced in the write command), or if all snapshot operations whose source is the volume reference in the write command have a timestamp that is earlier than or equal to the timestamp in the last chunk-version data element in the respective chunk-version data structure, the IO handler 526 can be configured to determine that the last chunk-version data element can be overwritten.

According to examples of the presently disclosed subject matter, the overwrite operation can involve updating the storage resources that were allocated to the last chunk-version data element with the write data in the current write command, and optionally updating the timestamp in the last chunk-version data element with the timestamp that indicates the state of the counter at the time when the current write command was received. As mentioned, in case the last chunk-version data element is overwritten, there is no need to allocate further storage layer resources, and the storage layer resources that were previously allocated to the last chunk-version data element can be used for storing the new write data. By way of example, the write data can be used to update and/or overwrite the data in the storage layer resources which were allocated to the overwritten chunk-version data element.

According to examples of the presently disclosed subject matter, if however at block 635 it was determined that there was a snapshot in which the volume referenced in the write command is a source volume and in which the timestamp associated with the snapshot operation is later than the timestamp of the last chunk-version data element, the IO handler 126 can be configured to maintain the last chunk-version data element in the chunk-version data structure that is associated with the write command, and the IO handler 126 can be configured to add to the chunk-version data structure a new chunk-version data element for the current write command (block 645).

According to examples of the presently disclosed subject matter, in case block 645 is implemented, the IO handler can be configured to request allocation of storage layer resources, for example, through the free storage layer resources list 524. The allocated storage layer resources are then removed from the free storage layer resources list. As mentioned above, the allocated storage layer resource can be a list or a range of storage layer block, a segment or segments of storage layer block or a storage layer chunk. In case storage layer blocks or a storage layer segment or segments are allocated, the allocation can correspond to the extent of write data in the write command (the storage space can be less than the full size of snapshot layer chunk), or the allocation of the storage layer block or segments can be in an extent which corresponds to the full size of a snapshot layer chunk.

The IO handler 126 can be configured to add a new chunk-version data element to the chunk-version data structure with which the write command is associated. The new chunk-version data element includes a reference to the storage layer resources that were allocated to the new version of the snapshot layer chunk, and the timestamp which represents the state of the counter at the time when the write command was receive, e.g., a current timestamp. It would be appreciated that the new chunk-version data element becomes the last chunk-version data element in the respective chunk-version data structure.

Following the addition of the new chunk-version data element to the chunk-version data structure with which the write command is associated, the IO handler 126 can proceed to instruct the storage layer 30 to write the write data in the storage resources that were allocated for the write command (block 695).

It would be appreciated, that the new chunk-version data element for the current write command will become the last chunk-version data element in the chunk-version data structure with which the write command is associated.

There is now provided a description of the handling by a storage system in accordance with examples of the presently disclosed subject matter of a series of write commands. The following description can be used as an example of an implementation of the method of handling writes in a storage system, according to examples of the presently disclosed subject matter, which was described above including with reference to FIG. 6.

Figure 7:
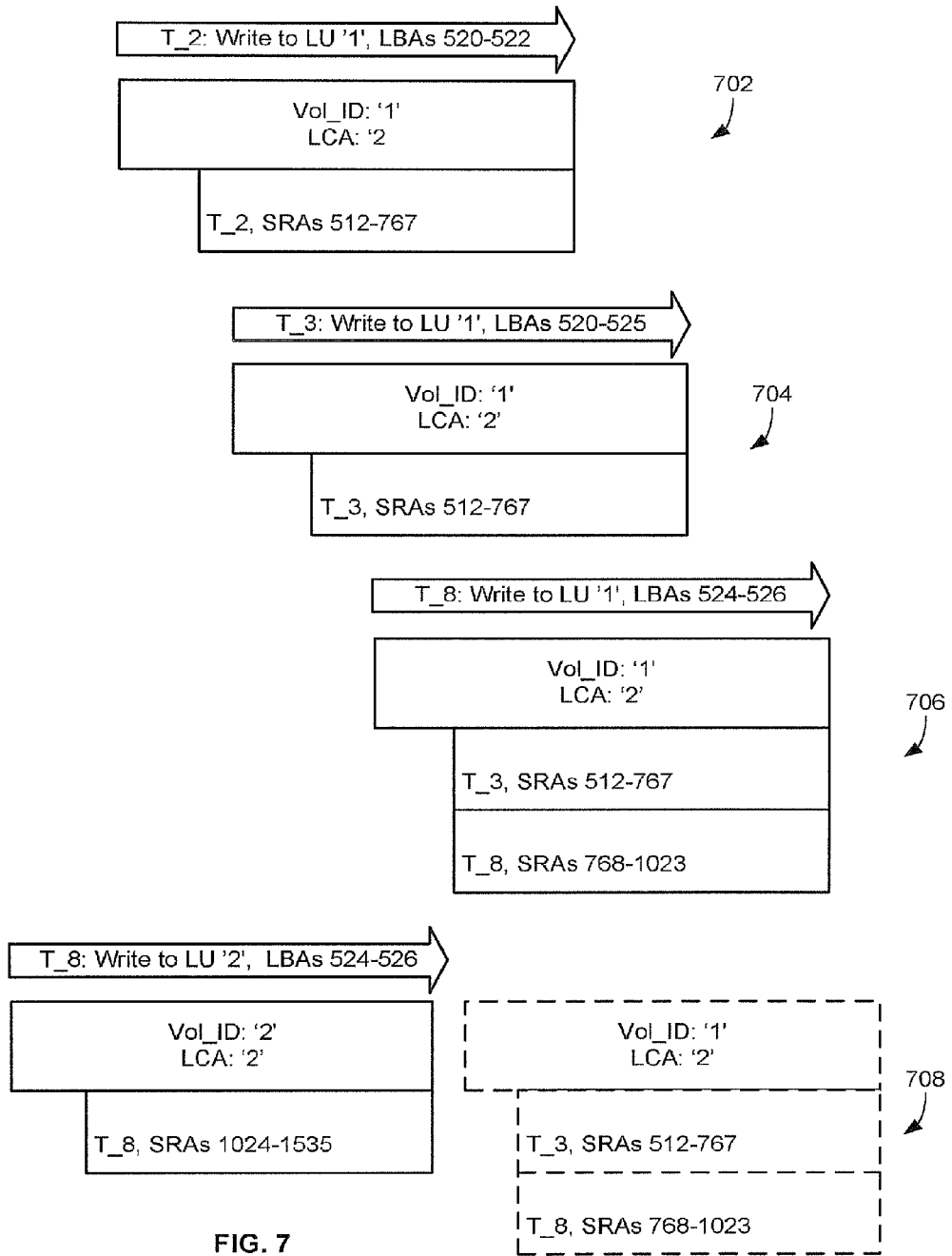
FIG. 7 is a graphical illustration of a chunk-version data structure, and the chunk-version data elements contained therein, at different time instants, according to examples of the presently disclosed subject matter.

Reference is now made to FIG. 7, which is a graphical illustration of a chunk-version data structure, and the chunk-version data elements contained therein, at different time instants, according to examples of the presently disclosed subject matter. For the sake of illustration, the scenario depicted in FIG. 7 corresponds with the volume-version data structure shown in FIG. 2. In addition, the chunk-version data structure illustrated in FIG. 7 can be implemented by a storage system such as the one illustrated in FIG. 1 and described above. The chunk-version data structure illustrated in FIG. 7 can also be implemented by a storage system such as the one illustrated in FIG. 5 and described above. It would be appreciated that the chunk-version data structure illustrated in FIG. 7 can be implemented by other suitably structured and configured storage systems and is not necessarily limited to the specific storage system examples used herein.

In FIG. 2 the volume which is associated with volume ID LU1 is created at T_0. As mentioned above, in response to the volume create command, the snapshot layer 20 can create a volume-version data structure and record in the volume-version data structure the volume ID of the new volume (LU1). Since this is the first volume in the volume-version data structure, LU1 is located at the root of the data structure (in case a tree data structure is used). This operation can be managed and controlled by an IO handler (referenced 126 in FIG. 1), which is implemented in the snapshot layer 20 or, in a further example, by a dedicated volume-version controller.

According to the example scenario depicted in FIG. 7, at time instant 702 a write command is received and processed in the storage system. As mentioned above, the storage system can implement a clock, a timer, or a counter which can be used to provide a timestamp for volume operations or for any other events of interest in the storage system. By way of example, at time instant 702, when the write command that is received, the counter state is T_2 and so the write command is associated with the logical timestamp T_2. Further by way of example, the write command at instant 702 references LU1 and LBAs 520-522. According to examples of the presently disclosed subject matter, each LBA is 8 bytes in size, and each chunk is 128 kb in size. Thus, the snapshot layer determines that the write command is associated with LCA2 in volume LU1. According to examples of the presently disclosed subject matter, the snapshot layer 20 (e.g., using the IO handler 126) can determine whether there is an existing chunk-version data structure for <LU1, LCA2>. If necessary, a data structure for LCA2 in volume LU1 can be created.

At instant 702, the chunk-version data structure for LCA2 in volume LU1 includes a chunk-version data element with the timestamp T_2 and a reference to SRAs 512-767. According to examples of the presently disclosed subject matter, the chunk-version data structure for LCA2 in volume LU1 can be created when the first write command referencing LCA2 in volume LU1 (or associated therewith) is received at the storage system 100, however, in other examples the chunk-version data structure can be created in advance, for example, when the volume (in this case LU1) is created.

According to examples of the presently disclosed subject matter, the snapshot layer 520 (e.g., using the IO handler 526) can receive the write command and determine, for example according to the mapping scheme that was described above, that the logical address referenced in the write command is associated with LCA2 in volume LU1. It would be appreciated that the aforementioned mapping scheme is merely an example, and that other mapping schemes can be devised an implemented in the storage system according to examples of the presently disclosed subject matter.

As was described above, when an incoming write command is received at the snapshot layer 520, the IO handler 526 (or any other snapshot layer controller) can be configured to consult a chunk provisioning data structure 522 to determine whether storage layer resources were allocated to the snapshot layer chunk with which the write command is associated. For the sake of illustration, it is to be noted that at some point after the creation of LU1, in this case at time instant 702, a write command which is addressed to LU1 may be received at the storage system, and in this case the write command references LBAs 520-522 in LU1. Further by way of example, according to the mapping scheme that is implemented by the IO handler 526, it is determined that the write command is associated with snapshot-layer chunk referenced by LCA2 in the volume LU1.

The IO handler 526 (or any other snapshot layer controller) than uses the key <LU1, LCA2> to search the chunk provisioning data structure 522 to determine whether storage layer resources were allocated to the snapshot layer chunk with which the write command is associated. According to the scenario of FIG. 7, the data in the chunk provisioning data structure 522 indicates that the snapshot-layer chunk associated with the key <LU1, LCA2> has not been provisioned yet. Accordingly, the IO handler 526 can request allocation of storage layer resources for this snapshot layer chunk from the free storage layer resource list 524. Further by way of example, according to the scenario in FIG. 7, the SRAs 512-767 are allocated for the snapshot layer chunk <LU1, LCA2>. Still further by way of example, the chunk-provisioning data structure 522 is updated to indicate that the snapshot layer chunk <LU1, LCA2> was provisioned, and a chunk-version data structure 122 is created for the snapshot layer chunk <LU1, LCA2>. Further by of example the entry in the chunk-provisioning data structure 522 which is associated with <LU1, LCA2> includes a pointer to the chunk-version data structure 122 that is associated with the snapshot layer chunk with which the <LU1, LCA2> is associated.

According to examples of the presently disclosed subject matter, further in response to the allocation of the SRAs to the snapshot layer chunk, a chunk-version data element 124 is added to the chunk-version data structure 122. The timestamp T_2 that was read from the counter when the respective write command was received (or at any other predefined time when the write command is processed) is included in the chunk-version data element, as well as the storage layer resources that were allocated for the current version of the snapshot layer chunk, which are in this case SRAs 512-767.

The IO handler 126 can then instruct the storage layer to write the write data in the SRAs that were allocated for the current version of the snapshot layer chunk.

Next, at instant 704, the state of the chunk-version data structure that is associated with the snapshot layer chunk <LU1, LCA2> is shown, after a further write command that is associated with this chunk is received and processed. The second write command to the snapshot layer chunk <LU1, LCA2> is received when the logical counter is at T_3. According to examples of the presently disclosed subject matter, the IO handler 526 searches for the <LU1, LCA2> key in the chunk provisioning data structure 522, and finds it. This indicates that there is an existing chunk-version data structure 124 for this snapshot layer chunk. The IO handler 526 is then configured to read the timestamp in the last chunk-version data structure in the chunk-version data structure 124. At this point, there chunk-version data structure 124 only includes a single chunk-version data element, the one that is associated with the timestamp T_2, and thus, the IO handler 526 determines that the timestamp of the last chunk-version data element in the relevant chunk-version data structure 124 is T_2.

Next, the IO handler 526 is configured to query the volume-version data structure 122 to determine if there was a snapshot operation where the volume referenced in the write command is a source volume, and if there is no snapshot operation whose source is the volume referenced in the write command, or if all snapshot operations whose source is the volume referenced in the write command have a timestamp that is earlier than or equal to the timestamp in the last chunk-version data element, the IO handler 526 can determine that the last chunk-version data element in the chunk-version data structure can be overwritten. It would be appreciated that there may be multiple snapshot operations which trace back to the volume referenced in the write command and which have a timestamp that is earlier than or equal to the timestamp of the last chunk-version element.

In the case of the write command that is processed at instant 704 there is no snapshot operation whose source is the volume referenced in the write command, and thus the IO handler 526 is configured to overwrite the last chunk-version data element in the relevant chunk-version data structure 124 with a chunk-version data element for the current write command. According to examples of the presently disclosed subject matter, overwriting the last chunk-version data element with a chunk-version data element for the current write command can include: overwriting the timestamp listed in the chunk-version data element with the timestamp for the current write command, and overwriting and/or updating the storage layer resources that are allocated to this chunk-version data element with the write data from the new write command. According to examples of the presently disclosed subject matter, the updating of the timestamp and the overwriting/updating of data in the storage layer can be carried out as a single atomic operation.

In the scenario shown in FIG. 7, at time instant 704, the last chunk-version data element in the chunk-version data structure that is associated with <LU1, LCA2> is updated, and the timestamp T_2 is replaced with the timestamp T_3. In addition, the data in the SRAs 512-767 is overwritten and/or updated to include the new write data. Further by way of example, if the write data in the write command that is associated with T_3 overlaps with some (or all) of the write data that was previously stored in the storage resources that are allocated to the chunk-version data element, the new write data will overwrite the existing data. Any non-overlapping data is used to update the allocated storage resources (there is no data there old data to overwrite).

Moving forward with the description of FIG. 7, at time instant 706 the chunk-version data structure that is associated with <LU1, LCA2> includes two chunk-version data elements. The chunk-version data element from instant 704 (the one which includes the timestamp T_3 and references SRAs 512-767) is retained, and a chunk-version data element which includes the timestamp T_8 and references SRAs 768-1023 is additionally included in the chunk-version data structure. The inclusion of two (or three, four, . . . , n) chunk-version data elements in a single chunk-version data structure indicates that, in addition to the last version of the respective snapshot-layer chunk, a (one or two, three, . . . , (n-1)) previous version(s) of this snapshot-layer chunk is required by the snapshot layer and cannot be overwritten or discarded. According to examples of the presently disclosed subject matter, the IO handler 126 can be configured to maintain a chunk-version data element that is associated with a previous version of the respective snapshot-layer chunk when this respective version of the snapshot-layer chunk is required by a snapshot volume (or by snapshot volumes) that was created subsequent to the creation of this version of the snapshot-layer chunk. The snapshot volume can be a direct snapshot of the volume with which the chunk-version data element is associated or it can or a source volume of a snapshot volume that is the source volume in a later snapshot operation, in case of a series of snapshot operations which trace back to the volume referenced in the write command.

For illustration, there is provided a description of a series of events which according to examples of the presently disclosed subject matter could have led to the state of the chunk-version data structure that is associated with <LU1, LCA2> at time instant 706. The events start after time instant 704, when a further write command that is associated with the snapshot-layer chunk <LU1, LCA2> is received. The write command is received when the logical counter is at T_8. According to examples of the presently disclosed subject matter, the IO handler 526 searches for the <LU1, LCA2> key in the chunk provisioning data structure 522, and finds it. This indicates that there is an existing chunk-version data structure 124 for this snapshot layer chunk. The IO handler 526 is then configured to read the timestamp in the last chunk-version data structure in the chunk-version data structure 124. At this point, there chunk-version data structure 124 includes a single chunk-version data element which includes the timestamp T_3, and thus, the IO handler 526 determines that the timestamp of the last chunk-version data element in the relevant chunk-version data structure 124 is T_3.

Next, the IO handler 526 is configured to query the volume-version data structure 122 to determine if there was a snapshot operation where the volume referenced in the write command is a source volume, and if there was such a snapshot operation, the IO handler is configured to determine whether the timestamp that is associated any of such snapshot operations is earlier than or equal to the timestamp of the last chunk-version element in the respective chunk-version data structure. It would be appreciated that there may be multiple snapshot operations which trace back to the volume referenced in the write command and which have a timestamp that is earlier than or equal to the timestamp of the last chunk-version element.

Thus, according to examples of the presently disclosed subject matter, at time instant 706, the IO handler 526 determines that an overwrite of the existing chunk-version data element (the one associated with T_3) is not appropriate (the snapshot from LU1 to LU2 has a timestamp T_7 which is later than T_3), and the IO handler 526 creates a new chunk-version data element. For example, the IO handler 526 can request an allocation of storage layer resources from the free storage layer resources list 524. By way of example, for the chunk-version data element that is associated with timestamp T_8, the free storage layer resources list allocated blocks 768-1023. The IO handler updates the chunk provisioning data structure 522, and as a result, at instant 706 the chunk-version data structure includes, in addition to the chunk-version data element associated with the timestamp T_3, a chunk-version data element that is associated with timestamp T_8, and each of the two chunk-version data elements is associated with a different set of storage layer blocks in a size which corresponds to a snapshot layer chunk.

The state of the chunk version data structure at instant 708 in the scenario illustrated in FIG. 7, by way of example, reflects the receipt of a write command referencing LU2 and LBA 524-526. For example, instant 708 immediately follows instant 706. The write command is received when the logical counter is at T_8. According to examples of the presently disclosed subject matter, the IO handler 526 searches for the <LU2, LCA2> key in the chunk provisioning data structure 522, and finds it. It is assumed here, that the snapshot layer chunk associated with <LU2, LCA2> had a previous version, but there are no snapshots whose timestamp is earlier than or equal to T_8. Accordingly, the write command that was received at instant 708 can overwrite or update the previous data, and the same storage layer resource that were allocated to the previous version of the snapshot layer chunk associated with <LU2, LCA2> can be used for storing the write data from the new write request, as was described above. The data in the chunk version data element that is associated with the key <LU2, LCA2> is updated in accordance with the current timestamp and the storage layer resources associated with the write operation. As is shown in FIG. 7, the update to chunk version data element that is associated with the key <LU2, LCA2> does not affect the chunk version data element that is associated with the key <LU1, LCA2>.

According to a further aspect of the presently disclosed subject matter, there is provided a method of handling reads in a storage system. According to examples of the presently disclosed subject matter, the method of handling reads in a storage system can include: maintaining a volume-version data structure including volume entries for the LU volume and for snapshot volumes associated with the LU volume, wherein for each volume a respective volume ID is kept, and for each snapshot a timestamp for the snapshot operation and an indication of a connection between a respective target volume and a source volume are kept; maintaining chunk-version data structures, each of which is associated with a volume ID and a logical chunk address which is associated with a plurality of logical blocks, and each of which includes one or more chunk version data elements, wherein each chunk version data element includes a timestamp that indicates the state of a counter when a corresponding write to the respective logical chunk address was received and a pointer to storage resources associated with the chunk-version element; in response to receiving a read command at the storage system referencing a plurality of logical blocks, initializing a read pointer with a volume ID and a logical chunk address with which the read command is associated, and setting a time-marker to a current process counter state; searching for a chunk-version data structure which is associated with the chunk read pointer, and if exists, reading data from storage resources referenced in a last chunk-version data element of the chunk-version data structure whose timestamp is not later than a current time-marker; wherein in case there are one or more logical blocks that are referenced in the read command and for which valid data was not yet searched, searching the volume-version data structure for an indication of a snapshot operation in which the volume ID in the read pointer is a target of a snapshot operation, and if the indication exists updating the read pointer with the volume ID of a source of the snapshot operation, and updating the time-marker with the timestamp of the snapshot operation; and repeating, using the updated read pointer and the updated time-marker, the search for a chunk-version data structure, the search for a last chunk version data element, the reading of the data, the search of the volume-version data structure, the update of the read pointer, and the update of the time-marker with the timestamp for the snapshot operation.

According to examples of the presently disclosed subject matter, the operations are repeated using an updated read pointer and an updated time-marker until all the data associated with one or more of the plurality of logical blocks referenced in the read command is obtained, or if at one of the iterations of the process no chunk version data element was found in the chunk-version data structure which is associated with the (current) chunk read pointer or if there is no chunk version data element in the chunk-version data structure whose timestamp is not later than a current time-marker, adding invalid values to a read response for the remaining logical blocks.

For sake of clarity, it should be noted that FIGS. 1-7 and the description thereof which was provided above, should be regarded, according to examples of the presently disclosed subject matter, as part of the description of the method of handling reads in a storage system, which is now described. It should be further noted that the method of handling reads in a storage system can be implemented in a storage system that is designed and managed according to the disclosure provided hereinabove, including with reference to FIGS. 1-7. In further examples of the presently disclosed subject matter, the system for handling reads in a storage system is not limited by some or all of the teachings provided above, in particular with reference to FIGS. 1-7.

Figure 8:
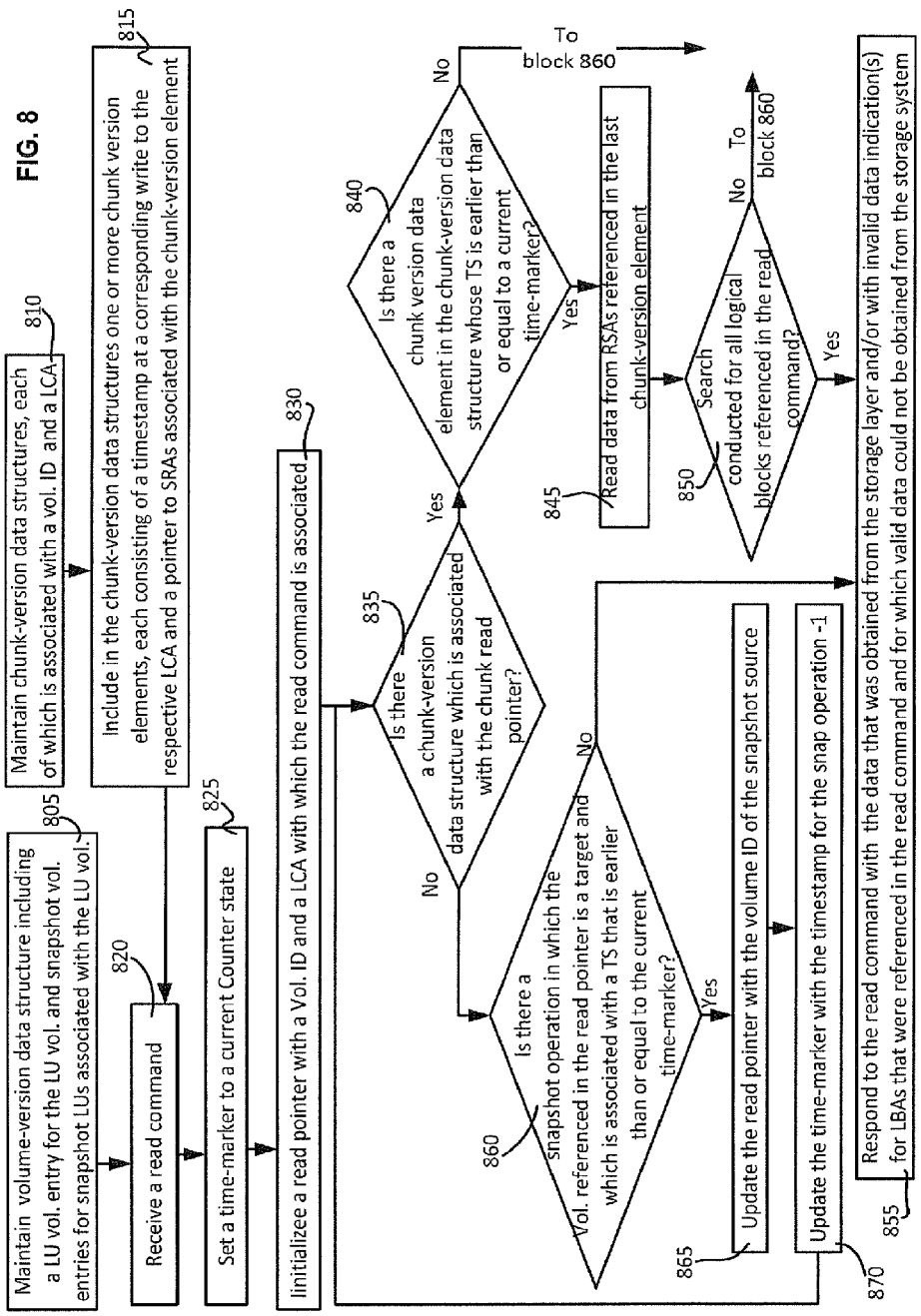
FIG. 8 is a flowchart illustration of a method of handling reads in a storage system, according to examples of the presently disclosed subject matter.

Reference is now made to FIG. 8, which is a flowchart illustration of a method of handling reads in a storage system, according to examples of the presently disclosed subject matter. Further by way of example, the method laid out in FIG. 8 can be implemented by the storage system shown in FIG. 1 and described above. Still further by way of example, the method laid out in FIG. 8 can be implemented by the storage system shown in FIG. 5 and described above. Accordingly, by way of non-limiting example, the description of FIG. 8 is made with additional reference to the storage system shown in FIG. 1 or with reference to the storage system shown in FIG. 5.

According to examples of the presently disclosed subject matter, a volume-version data structure including volume entries for a LU volume and for snapshot volumes associated with the LU volume can be kept (block 805). For each volume a respective volume ID can be kept in the volume-version data structure, and for each snapshot a timestamp for the snapshot operation and an indication of a connection between a respective target volume and a source volume can be kept in the volume-version data structure. The structure and the management of the volume-version data structure was described above with reference to FIGS. 1-7 and the teachings provided above are also applicable here.

One or more chunk-version data structures can also be maintained, where each one of the chunk-version data structures is associated with a volume ID and a logical chunk address (block 810). Each logical chunk address is associated with a plurality of logical blocks. In each chunk-version data structure, one or more chunk version data elements can be included, where each chunk version data element includes a timestamp at a corresponding write to the respective logical chunk address and a pointer to storage resources associated with the chunk-version data element (block 815). The structure and the management of a chunk-version data structure and of a chunk version data element was described above with reference to FIGS. 1-7 and the teachings provided above are also applicable here.

At some point, a read command can be received (block 820) at the storage system and can be processed in the snapshot layer. The read command can reference a plurality of logical blocks (e.g., LBAs). According to examples of the presently disclosed subject matter, in response to receiving the read command at the storage system, a time-marker can be set to a current counter state (block 825). Further by way of example, and still further in response to receiving the read command at the storage system, a read pointer can be initialized with a volume ID and a logical chunk address with which the read command is associated (block 830).

Once the initialization is completed, a iterative process can commence. The iterative process can consist of zero or more (zero, one, two, ..., n) iterations. At block 835 it is determined whether there is a chunk-version data structure which is associated with a current chunk read pointer.

According to examples of the presently disclosed subject matter, if at block 835 it is determined that there is a chunk-version data structure which is associated with the chunk read pointer, the process can process to block 840, where it can be determined whether there is a last chunk version data element in the chunk version data structure whose timestamp is not later than a current time-marker (block 840). If it is determined that there is a chunk-version data structure which is associated with the chunk read pointer, and that there is a chunk version data element in the chunk version data structure whose timestamp is earlier than or equal to a current time-marker, then the last chunk version data element in the chunk version data structure whose timestamp is earlier than or equal to a current time-marker is selected. From this last chunk version data element, the RSAs which are referenced therein are obtained (e.g., read), and the data that is stored in the RSAs which are referenced in the last chunk version data element is read (block 845).

According to examples of the presently disclosed subject matter, the data that is read in block 845 can be temporarily stored in a read buffer (not shown). It would be appreciated that several read operations may be required in order to generate a complete response to the read command.

After the data is read from the storage layer, in block 850 it is determined the process was implemented for all of the LBAs that were referenced in the read command. In case in block 850 it is determined that the process was indeed implemented for all of the LBAs that were referenced in the read command, a response to the read command can be generated with the data that was obtained from the storage layer and/or with invalid data indication(s) for LBAs that were referenced in the read command and for which valid data could not be obtained from the storage system (block 855). The invalid indications can be, for example, zero values.

Resuming the description of the examples of the presently disclosed subject matter illustrated in FIG. 8, if at block 835 it is determined that there is no chunk-version data structure which is associated with a current chunk read pointer, or if is determined, after the execution of block 850, that a further iteration of the process may be required, i.e., when it is determined at block 850 that there is at least one more LBA that was referenced in the read command and in respect of which the search for write data in the storage layer was not yet implemented or completed, block 860 may be implemented, where it can be determined whether there is a snapshot operation in which the volume referenced in the read pointer is a target of a snapshot operation whose associated timestamp is earlier than or equal to the current time-marker.

If it is determined, e.g., according to the volume version data structure, that there exists a snapshot operation in which the volume referenced in the read pointer is a target of a snapshot operation, and that snapshot operation is associated with a timestamp that is earlier than or equal to the current time-marker, the read pointer can be updated with the volume ID of the snapshot source (block 865), and the time-marker can be updated with the timestamp immediately preceding the timestamp of the snapshot operation (snapshot timestamp—1) (block 870), and from there the process returns to block 835, which was described above.

According to examples of the presently disclosed subject matter, the evaluation in block 860 can be implemented when:
  a. after the execution of block 835 it is determined there is no chunk-version data structure which is associated with the current chunk read pointer, or
  b. after the execution of block 840 it is determined that in the chunk-version data structure which is associated with the current chunk read pointer there isn't a chunk version data element whose timestamp is earlier than or equal to a current time-marker, or
  c. after the execution of block 850 it is determined that a further iteration of the process may be required, it is determined at block 850 that there is at least one more LBA that was referenced in the read command and in respect of which the search for write data in the storage layer was not yet implemented or completed.

According to further examples of the presently disclosed subject matter, a response to the read command can be generated with the data that was obtained from the storage layer and/or with invalid data indication(s) for LBAs that were referenced in the read command and for which valid data could not be obtained from the storage system (block 855), when it is determined that:
  a. after the execution of block 850 it is determined that the search for write data in the storage layer was carried out for each one of the LBAs referenced in the write command, or
  b. after the execution of block 860 it is determined that there is no snapshot operation in which the volume referenced in the read pointer is a target of a snapshot operation whose associated timestamp is earlier than or equal to the current time-marker.

It would be appreciated that in some examples of the presently disclosed subject matter, the process illustrated in FIG. 8 when implemented with the volume version data structure, the chunk version data structure and possibly also the chunk provisioning data structure and the free storage layer resources list, can support an efficient and reliable storage system which implements snapshots (including revert operations) and manages multiple chunk layer versions.

Figure 9:
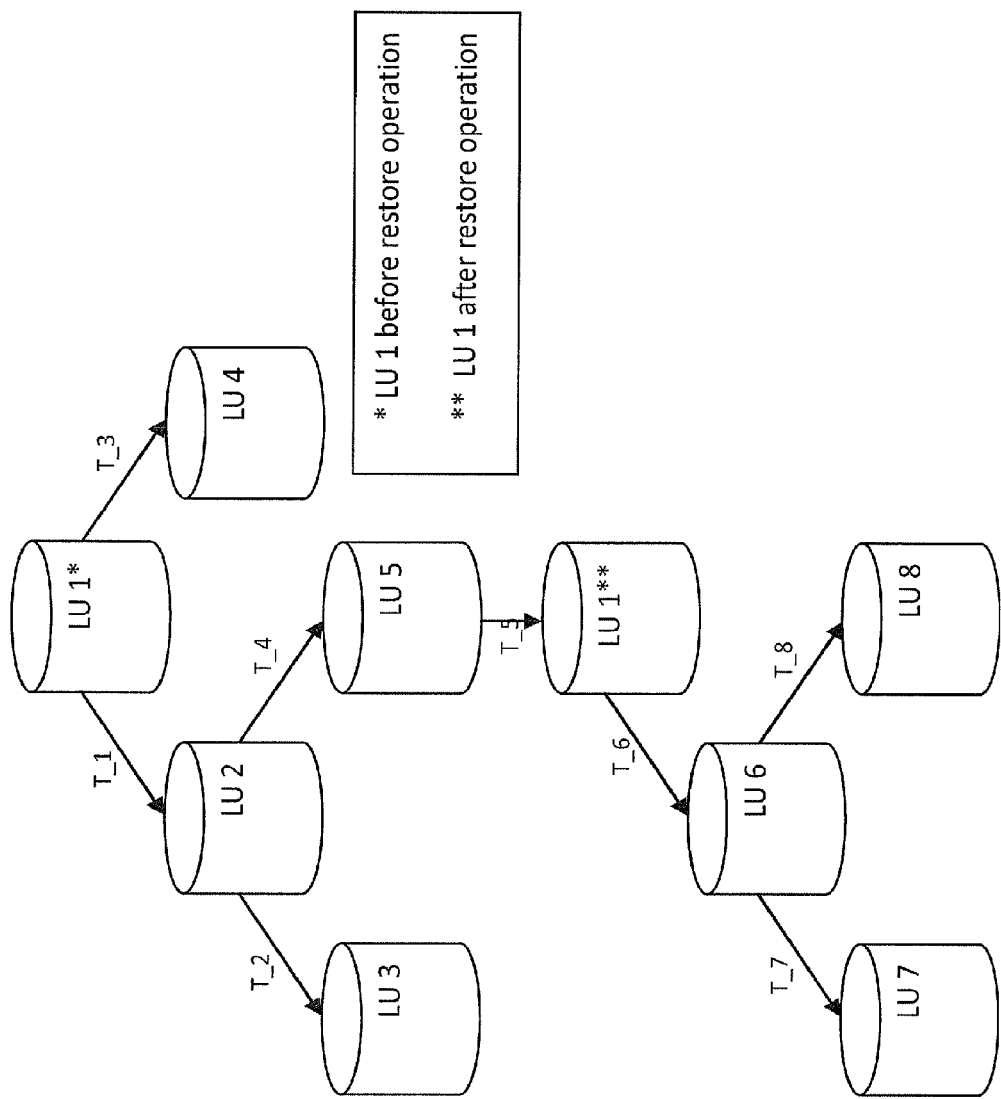
FIG. 9 is a graphical illustration of one aspect of an example of a scenario that involves a series of operations that are carried out according to examples of the presently disclosed subject matter.

There is provided below Table 1 that is accompanied by FIG. 9, which together illustrate an example of a scenario that involves a series of operations that are carried out according to examples of the presently disclosed subject matter. The operations in Table 1 are responsive to snapshot create commands, volume restore command, read commands and write commands, and are processed using examples of a method of managing a storage system, examples of a method of handling writes in a storage system, and examples of a method of handling reads in a storage system, all of which according to examples of the presently disclosed subject matter. FIG. 9 provides a schematic illustration of one example of a possible implementation of the volume-version data structure and corresponds to operations included in Table 1, according to examples of the presently disclosed subject matter.

Each row in Table 1 is associated with a certain snapshot create command, volume restore command, read command or write command. The cells in the leftmost column in Table 1 list the logical timestamp that is associated with the IO command with which the respective row is associated. The cells in the second to last column from the left, each include a description of the IO command to which the respective row relates. The cells in the second to last column from the right, provide a description of the main operations that take place in the snapshot layer in response to the respective IO command. The cells in the rightmost column provide the number of the storage layer chunk that is involved in the servicing of the IO command. In this regard, it would be recalled that the free storage layer resources list 524 that was described above with reference to FIG. 5 can hold storage layer chunks which are enumerated, with each storage layer chunk being associated with a corresponding set of storage layer blocks of a certain size.

TABLE 1

| Logical Timestamp | IO Command | Snapshot IO algorithm | Storage Layer Chunk No. |
|---|---|---|---|
| T_0 | User creates LU 1* | A volume-version data structure is created and LU1 is added to the volume-version data structure (at the root). | |
| T_0 | Write to LU1*, LBA 1000 | Is there a snapshot layer chunk registered in the chunk provisioning data structure that is associated with <LU1, LBA1000> → No Request an allocation of storage layer resources from the free storage layer resource list → storage layer chunk <0000> is allocated Indicate in the chunk provisioning data structure that the snapshot layer chunk that is associated with <LU1, LBA1000> was provisioned, and create a chunk-version data structure and register it in the chunk provisioning data structure using the key <LU1, LBA1000>. Create a chunk-version data element in the chunk-version data structure that is associated with <LU1, LBA1000> and include in the chunk-version data element the timestamp <T_0> and the allocated storage layer chunk <0000>. | 0000 |
| T_0 | Read from LU1*, LBA 1000 | Is there a chunk version data structure that is associated with <LU1, LBA1000>? → YES Is there a chunk version data element (in the chunk version data structure that is associated with <LU1, LBA1000>) whose timestamp is earlier than or equal to T_0? → YES Select the last chunk version data element (in the chunk version data structure that is associated with <LU1, LBA1000>) whose timestamp is earlier than or eual to T_0 and read data from the storage layer according to the storage layer chunk no. referenced in the selected chunk version data element. → Read data from 0000 Search conducted for all logical blocks referenced in the read command? → YES Respond to read command → Generate read response with the data stored in the SRAs associated with storage layer chunk no. 0000 | 0000 |
| T_0 | Read to LU1, LBA 3000 | Is there a chunk version data structure that is associated with <LU1, LBA3000>? → No Respond to read command → Generate read response with invalid values (zeros) to indicate formatted data in the storage system for the logical address referenced in the write command. | Pointer to zero buffer |
| T_1 | Create Snapshot from LU 1* to LU 2 | Add LU2 to the volume-version data structure with a connector from LU1 (the source volume) to LU2 (the target volume) to indicate a snapshot operation and from LU1 to LU2 and on the connector write the timestamp <T_1> | |

TABLE 1-continued

| Logical Timestamp | IO Command | Snapshot IO algorithm | Storage Layer Chunk No. |
|---|---|---|---|
| T_1 | Read from LU2, LBA 1000 | Is there a chunk version data structure that is associated with <LU2, LBA1000>? → No<br>Is there a snapshot operation in which LU2 is a target and which is associated with a timestamp that is earlier than or equal to 1? → Yes (LU1)<br>Update the read pointer with the volume ID of the snapshot source → read pointer = LU1<br>Update the time marker with the timestamp for the snapshot operation −1 → time marker = T_0<br>Is there a chunk version data structure that is associated with <LU1, LBA1000>? → Yes<br>Is there a chunk version data element (in the chunk version data structure that is associated with <LU1, LBA1000>) whose timestamp is earlier than or equal to T_0? → YES<br>Select the last chunk version data element (in the chunk version data structure that is associated with <LU1, LBA1000>) whose timestamp is earlier than or equal to T_0 and read data from the storage layer according to the storage layer chunk no. referenced in the selected chunk version data element. → READ DATA FROM 0000<br>Search conducted for all logical blocks referenced in the read command? → YES<br>Respond to read command → Generate read response with the data stored in the SRAs associated with storage layer chunk no. 0000 | 0000 |
| T_2 | Create Snapshot from LU 2 to LU 3 | Add LU3 to the volume-version data structure with a connector from LU2 (the source volume) to LU3 (the target volume) to indicate a snapshot operation and from LU2 to LU3 and on the connector write the timestamp <T_2> | |
| T_3 | Create Snapshot from LU 1* to LU 4 | Add LU4 to the volume-version data structure with a connector from LU1 (the source volume) to LU4 (the target volume) to indicate a snapshot operation and from LU1 to LU4 and on the connector write the timestamp <T_3> | |
| T_4 | Create Snapshot from LU 2 to LU 5 | Add LU5 to the volume-version data structure with a connector from LU2 (the source volume) to LU5 (the target volume) to indicate a snapshot operation and from LU2 to LU5 and on the connector write the timestamp <T_4> | |
| T_4 | Write to LU1, LBA 3000 | Is there a snapshot layer chunk registered in the chunk provisioning data structure that is associated with <LU1, LBA3000> → No<br>Request an allocation of storage layer resources from the free storage layer resource list → Storage layer chunk <1000> is allocated<br>Indicate in the chunk provisioning data structure that the snapshot layer chunk that is associated with <LU1, LBA3000> was provisioned, and create a chunk-version data structure and register it in the chunk provisioning data structure using the key <LU1, LBA3000>.<br>Create a chunk-version data element in the chunk-version data structure that is associated with <LU1, LBA3000> and include in the chunk-version data element the timestamp <T_4> and the allocated storage layer chunk <1000>. | 1000 |
| T_4 | Write to LU5, LBA 3000 | Is there a snapshot layer chunk registered in the chunk provisioning data structure that is associated with <LU5, LBA3000> → No | 2000 |

TABLE 1-continued

| Logical Timestamp | IO Command | Snapshot IO algorithm | Storage Layer Chunk No. |
|---|---|---|---|
| | | Request an allocation of storage layer resources from the free storage layer resource list → Storage layer chunk <2000> is allocated<br>Indicate in the chunk provisioning data structure that the snapshot layer chunk that is associated with <LU5, LBA3000> was provisioned, and create a chunk-version data structure and register it in the chunk provisioning data structure using the key <LU5, LBA3000>.<br>Create a chunk-version data element in the chunk-version data structure that is associated with <LU5, LBA3000> and include in the chunk-version data element the timestamp <T_4> and the allocated storage layer chunk <2000>. | |
| T_4 | Read from LU1, LBA 3000 | Is there a chunk version data structure that is associated with <LU1, LBA3000>? → YES<br>Is there a chunk version data element (in the chunk version data structure that is associated with <LU1, LBA3000>) whose timestamp is no greater than T_4? → YES<br>Select the last chunk version data element (in the chunk version data structure that is associated with <LU1, LBA3000>) whose timestamp is no greater than (earlier than or equal to) T_4 and read data from the storage layer according to the storage layer chunk no. referenced in the selected chunk version data element. → READ DATA FROM 1000<br>Search conducted for all logical blocks referenced in the read command? → YES<br>Respond to read command → Generate read response with the data stored in the sras associated with storage layer chunk no. 1000 | 1000 |
| T_5 | Create Snapshot of type 'REVERT' from LU 5 to LU 1 | Add a new node to the volume-version data structure referenced with LU1 and add a connector from LU5 (the source volume) to LU1 (the target volume) to indicate a snapshot operation and from LU5 to LU1, on the connector write the timestamp <T_5><br>mark the previous node that was reference with LU1 as 'REMOVED' | |
| T_5 | Read from LU1, LBA 3000 | Is there a chunk version data structure that is associated with <LU1, LBA3000>? → No<br>Is there a snapshot operation in which LU1 is a target and which is associated with a timestamp that is earlier than or equal to 5? → Yes (LU5)<br>Update the read pointer with the volume ID of the snapshot source → read pointer = LU5<br>Update the time marker with the timestamp for the snapshot operation −1 →time marker = T_4<br>Is there a chunk version data structure that is associated with <LU5, LBA3000>? → Yes<br>Is there a chunk version data element (in the chunk version data structure that is associated with <LU5, LBA3000>) whose timestamp is earlier than or equal to T_4? → YES<br>Select the last chunk version data element (in the chunk version data structure that is associated with <LU5, LBA3000>) whose timestamp is no greater than T_4 and read data from the storage layer according to the storage layer chunk no. referenced in the selected chunk version data element. → Read data from 2000<br>Search conducted for all logical blocks referenced in the read command? → YES<br>Respond to read command → Generate read response with the data stored in the SRAs associated with storage layer chunk no. 2000 | 2000 |

TABLE 1-continued

| Logical Timestamp | IO Command | Snapshot IO algorithm | Storage Layer Chunk No. |
|---|---|---|---|
| T_6 | Create Snapshot from LU 1 to LU 6 | Add LU6 to the volume-version data structure with a connector from LU1 (the source volume) to LU6 (the target volume) to indicate a snapshot operation and from LU1 to LU6 and on the connector write the timestamp <T_6> | |
| T_6 | Write to LU2, LBA 1000 | Is there a snapshot layer chunk registered in the chunk provisioning data structure that is associated with <LU2, LBA1000> → No Request an allocation of storage layer resources from the free storage layer resource list → Storage layer chunk <3000> is allocated Indicate in the chunk provisioning data structure that the snapshot layer chunk that is associated with <LU2, LBA1000> was provisioned, and create a chunk-version data structure and register it in the chunk provisioning data structure using the key <LU2, LBA1000>. Create a chunk-version data element in the chunk-version data structure that is associated with <LU2, LBA1000> and include in the chunk-version data element the timestamp <T_6> and the allocated storage layer chunk <3000>. | 3000 |
| T_7 | Create Snapshot from LU 6 to LU 7 | Add LU7 to the volume-version data structure with a connector from LU6 (the source volume) to LU7 (the target volume) to indicate a snapshot operation and from LU6 to LU7 and on the connector write the timestamp <T_7> | |
| T_7 | Write to LU1, LBA 1000 | Is there a snapshot layer chunk registered in the chunk provisioning data structure that is associated with <LU1, LBA1000> → No Request an allocation of storage layer resources from the free storage layer resource list → Storage layer chunk <4000> is allocated Indicate in the chunk provisioning data structure that the snapshot layer chunk that is associated with <LU1, LBA1000> was provisioned, and create a chunk-version data structure and register it in the chunk provisioning data structure using the key <LU1, LBA1000>. Create a chunk-version data element in the chunk-version data structure that is associated with <LU1, LBA1000> and include in the chunk-version data element the timestamp <T_7> and the allocated storage layer chunk <4000>. | 4000 |
| T_7 | Write to LU2, LBA 1000 | Is there a snapshot layer chunk registered in the chunk provisioning data structure that is associated with <LU2, LBA1000> → YES → Read a timestamp of a last chunk-version element in the existing chunk-version data structure → T_6. Is there a snapshot operation whose source is the volume referenced in the write command (LU_2)?→ YES at T_2 and at T_4 → are all snapshot operations whose source is LU_2 have a timestamp that is earlier than or equal to the timestamp of the last chunk-version data element in the chunk version data structure <LU2, LBA1000>? → YES (the timestamp of the last chunk-version data element in the chunk version data structure <LU2, LBA1000> is T_6). Overwrite the last chunk-version data element in the chunk version data structure that is associated with <LU2, LBA1000> with a chunk version data element that includes a reference to storage layer chunk <3000> and to timestamp T_7. | 3000 |

TABLE 1-continued

| Logical Timestamp | IO Command | Snapshot IO algorithm | Storage Layer Chunk No. |
|---|---|---|---|
| T_8 | Create Snapshot from LU6 to LU8 | Add LU8 to the volume-version data structure with a connector from LU6 (the source volume) to LU8 (the target volume) to indicate a snapshot operation and from LU6 to LU8 and on the connector write the timestamp <T_8> | |

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method of managing data in a storage system, comprising:
maintaining a volume-version data structure including logical unit (LU) volume entries for a LU volume and for snapshot volumes associated with the LU volume, wherein for each volume a respective volume identifier (ID) is kept, and for each snapshot a timestamp for a snapshot operation and an indication of a connection between a respective target volume and a source volume are kept;
maintaining a chunk-version data structure that is uniquely associated with a volume ID and a logical chunk address combination;
including in the chunk-version data structure one or more chunk-version data elements, each chunk version data element including a timestamp at a corresponding write to the respective logical chunk address in the respective volume and a pointer to storage resources associated with the chunk-version data element.

2. The method according to claim 1, wherein responsive to an instruction to create a new snapshot volume where a source of the snapshot is the LU volume or a snapshot volume that is associated with the LU volume, updating the volume-version data structure with: a volume ID reference for the new snapshot-volume, an indication of a connection between the new snapshot-volume and the source, and a timestamp for the snapshot operation.

3. The method according to claim 2, wherein further in response to the instruction to create a new snapshot volume suspending IO to the source volume and incrementing a timestamp for the snapshot operation, and once the snapshot operation is complete, enabling IOs to the source volume to resume.

4. The method according to claim 1, further comprising responsive to receiving a write command in the storage system:
determining with which snapshot layer chunk the write command is associated; and
determining whether there is an existing chunk version data structure which is associated with the snapshot layer chunk with which the write command is associated.

5. The method according to claim 4, wherein in case there is no existing chunk version data structure which is associated with the snapshot layer chunk with which the write command is associated, generating a new chunk version data structure that is uniquely associated with the volume ID and with a logical chunk address of the snapshot layer chunk with which the write command is associated, and generating in the chunk-version data structure a chunk-version data element including a current timestamp and a pointer to storage resources that were allocated for this chunk-version data element.

6. The method according to claim 5, wherein the timestamp is a logical timestamp, and wherein the logical timestamp is incremented as a result of a volume create, a snapshot create or a revert operation.

7. The method according to claim 4, wherein in case there is an existing chunk version data structure which is associated with the snapshot layer chunk with which the write command is associated, determining whether a new chunk version data element needs to be generated or whether an existing chunk version data element can be overwritten.

8. The method according to claim 7, wherein in case it is determined that a new chunk version data element needs to be generated, allocating storage resources for the new chunk version data element.

9. The method according to claim 8, further comprising requesting allocation of storage resources for the new chunk version data element from a free storage layer resources list.

10. The method according to claim 7, wherein in case it is determined that there is an existing chunk version data structure which is associated with the snapshot layer chunk with which the write command is associated, and that an existing chunk version data element can be overwritten, writing write data of the write command in storage resources that were allocated to a last chunk version data element in the chunk version data structure.

11. The method according to claim 10, wherein in response to writing the write data of the write command in the storage resources that were allocated to the last chunk version data element in the chunk version data structure updating the timestamp of the last chunk version data element with a current timestamp.

12. The method according to claim 7, wherein determining whether a new chunk version data element needs to be generated or whether an existing chunk version data element can be overwritten, comprises:
reading a timestamp from a last chunk-version data element in the existing chunk-version data structure; and
in a case where there is no snapshot operation whose source is the LU volume or the snapshot volume of the snapshot layer chunk with which the write command is associated, or in a case where all snapshot operations whose source is the LU volume or the snapshot volume of the snapshot layer chunk with which the write command is associated have a timestamp that is earlier than or equal to the timestamp in the last chunk-version data element, determining that the last chunk-version data element in the existing chunk-version data structure can be overwritten.

13. The method of claim 1, further comprising:
(a) in response to receiving a read command at the storage system determining with which volume and with which snapshot layer chunk the read command is associated, initializing a read pointer with respective volume ID and logical chunk address, and initializing a time-marker according to a timestamp at receipt of the read command;
(b) determining whether there is a chunk-version data structure that is associated with a current read pointer;
(c1) if the condition in operation (b) is not met, determining whether there is a snapshot operation where the volume that is referenced in the write pointer is a target volume and whether the snapshot operation is associated with a timestamp that is not greater than the current time-marker; and
(d1) if the conditions in operation (c) are met updating the read pointer with a volume ID of a source volume of the snapshot operation, updating the time-marker with the timestamp for the snapshot operation—1, and returning to operation (b).

14. The method according to claim 13, further comprising:
(c2) if the condition in operation (b) is met, determining whether in the chunk version data structure there is a chunk version data element whose timestamp is not greater than a current time-marker; and
(e1) if the condition in operation (c2) is met reading data from the storage resource referenced in a last chunk version element of the chunk version data structure.

15. The method according to claim 14, wherein in response to implementing operation (e1):
(f) determining whether a search was conducted for all logical blocks referenced in the read command;
(g1) and if the condition in operation (f) is met responding to the read command with data obtain in operation (e1) and including invalid data indication(s) for data blocks referenced in the read command for which valid data could not be obtained.

16. The method according to claim 15, wherein in case the condition in operation (f) is not met, returning to operation (c1).

17. The method according to claim 14, wherein in case the condition in operation (c2) is not met, returning to operation (c1).

18. A storage system, comprising:
a storage layer providing storage resources;
a snapshot layer comprising:
a volume-version data structure including LU volume entries for an LU volume and for snapshot volumes associated with the LU volume, wherein for each volume a respective volume ID is kept, and for each snapshot a timestamp for the snapshot operation and an indication of a connection between a respective target volume and a source volume are kept;
a chunk-version data structure that is uniquely associated with a volume ID and a logical chunk address combination;
an Input/Output (TO) handler that is configured to include in the chunk-version data structure one or more chunk-version data elements, each chunk version data element including a timestamp at a corresponding write to the respective logical chunk address in the respective volume and a pointer to storage resources associated with the chunk-version data element.

19. The storage system according to claim 18, wherein responsive to an instruction to create a new snapshot volume where a source of the snapshot is the LU volume or a snapshot volume that is associated with the LU volume, the IO handler is configured to update the volume-version data structure with: a volume ID reference for the new snapshot-volume, an indication of a connection between the new snapshot-volume and the source, and a timestamp for the snapshot operation.

20. The storage system according to claim 18, further comprising responsive to receiving a write command in the storage system:
the IO handler is configured to determine with which snapshot layer chunk the write command is associated; and
the IO handler is configured to determine whether there is an existing chunk version data structure which is associated with the snapshot layer chunk with which the write command is associated.

21. The storage system according to claim 20, wherein in case there is no existing chunk version data structure which is associated with the snapshot layer chunk with which the write command is associated, the IO handler is configured to generate a new chunk version data structure that is uniquely associated with the volume ID and with a logical chunk address of the snapshot layer chunk with which the write command is associated, and to generate in the chunk-version data structure a chunk-version data element including a current timestamp and a pointer to storage resources that were allocated for this chunk-version data element.

22. The storage system according to claim 20, wherein in case there is an existing chunk version data structure which is associated with the snapshot layer chunk with which the write command is associated, the IO handler is configured to determine whether a new chunk version data element needs to be generated or whether an existing chunk version data element can be overwritten.

23. The storage system according to claim 22, wherein the IO handler is configured to determine whether a new chunk version data element needs to be generated or whether an existing chunk version data element can be overwritten, by:
reading a timestamp from a last chunk-version data element in the existing chunk-version data structure; and
in a case where there is no snapshot operation whose source is the LU volume or the snapshot volume of the snapshot layer chunk with which the write command is associated, or in a case where all snapshot operations whose source is the LU volume or the snapshot volume of the snapshot layer chunk with which the write command is associated have a timestamp that is earlier than or equal to the timestamp in the last chunk-version data element, the IO handler is configured to determine that the last chunk-version data element in the existing chunk-version data structure can be overwritten.

24. The storage system of claim 18, wherein responsive to receiving a read command, the IO handler is further configured for:
(a) determining with which volume and with which snapshot layer chunk the read command is associated, initializing a read pointer with respective volume ID and logical chunk address, and initializing a time-marker according to a timestamp of the read command;
(b) determining whether there is a chunk-version data structure that is associated with a current read pointer;
(c1) if the condition in operation (b) is not met, determining whether there is a snapshot operation where the volume that is referenced in the write pointer is a target volume and whether the snapshot operation is associated with a timestamp that is not greater than the current time-marker; and (d1) if the conditions in operation (c1) are met the IO handler is configured for: updating the read pointer with a volume ID of a source volume of the snapshot operation, updating the time-marker with the timestamp for the snapshot operation—1, and returning to operation (b).

25. The storage system according to claim 24, wherein in case the condition in operation (b) is met the IO handler is configured for:

(c2) determining whether in the chunk version data structure there is a chunk version data element whose timestamp is not greater than a current time-marker; and (e1) if the condition in operation (c2) is met the IO handler is configured for reading data from the storage resource referenced in a last chunk version element of the chunk version data structure.

26. A program storage device readable by machine, tangibly embodying a program of instructions executable by the machine to perform a method of managing data in a storage system, comprising:

maintaining a volume-version data structure including LU volume entries for an LU volume and for snapshot volumes associated with the LU volume, wherein for each volume a respective volume ID is kept, and for each snapshot a timestamp for the snapshot operation and an indication of a connection between a respective target volume and a source volume are kept;

maintaining a chunk-version data structure that is uniquely associated with a volume ID and a logical chunk address combination; and including in the chunk-version data structure one or more chunk-version data elements, each chunk version data element including a timestamp at a corresponding write to the respective logical chunk address in the respective volume and a pointer to storage resources associated with the chunk-version data element.

27. The program storage device of claim 26, wherein the program of instructions further comprising:

in response to receiving a write command determining with which snapshot layer chunk the write command is associated, and whether there is an existing chunk version data structure which is associated with the snapshot layer chunk with which the write command is associated;

in case the write command is associated with an existing chunk-version data structure, reading a timestamp from a last chunk-version data element in the existing chunk-version data structure, and in a case where there is a snapshot operation whose source is a LU volume or a snapshot volume of the snapshot layer chunk with which the write command is associated and this snapshot operation is associated with a timestamp that is later than a timestamp of the last chunk-version data element, maintaining the last chunk-version data element and adding to the existing chunk-version data structure a new chunk version data element for the write command.

28. The program storage device of claim 26, wherein, wherein the program of instructions further comprising:

(a) in response to receiving a read command at the storage system determining with which volume and with which snapshot layer chunk the read command is associated, initializing a read pointer with respective volume ID and logical chunk address, and initializing a time-marker according to a timestamp of the read command;

(b) determining whether there is a chunk-version data structure that is associated with a current read pointer;

(c1) if the condition in operation (b) is not met, determining whether there is a snapshot operation where the volume that is referenced in the write pointer is a target volume and whether the snapshot operation is associated with a timestamp that is not greater than the current time-marker; and (d1) if the conditions in operation (c) are met updating the read pointer with a volume ID of a source volume of the snapshot operation, updating the time-marker with the timestamp for the snapshot operation—1, and returning to operation (b).

29. A computer program product comprising a non-transitory computer useable medium having computer readable program code embodied therein for managing data in a storage system, the computer program product comprising:

computer readable program code for causing the computer to maintain a volume-version data structure including LU volume entries for an LU volume and for snapshot volumes associated with the LU volume, wherein for each volume a respective volume ID is kept, and for each snapshot a timestamp for the snapshot operation and an indication of a connection between a respective target volume and a source volume are kept;

computer readable program code for causing the computer to maintain a chunk-version data structure that is uniquely associated with a volume ID and a logical chunk address combination; and computer readable program code for causing the computer to include in the chunk-version data structure one or more chunk-version data elements, each chunk version data element including a timestamp at a corresponding write to the respective logical chunk address in the respective volume and a pointer to storage resources associated with the chunk-version data element.

30. The computer program product of claim 29, the computer program product further comprising:

computer readable program code that is responsive to receiving a write command in the storage system for causing the computer to determine with which snapshot layer chunk the write command is associated, and to determine whether there is an existing chunk version data structure which is associated with the snapshot layer chunk with which the write command is associated;

computer readable program code for causing the computer to determine whether the write command is associated with an existing chunk-version data structure, and in case the write command is associated with an existing chunk-version data structure, the computer readable program code is configured to cause a timestamp from a last chunk-version data element in the existing chunk-version data structure to be read, and in a case where there is a snapshot operation whose source is a LU volume or a snapshot volume of the snapshot layer chunk with which the write command is associated and this snapshot operation is associated with a timestamp that is later than a timestamp of the last chunk-version data element, the computer readable program code is configured to cause the last chunk-version data element to be maintained and a new chunk version data element for the write command to be added to the existing chunk-version data structure.

* * * * *